United States Patent [19]

Greenawalt et al.

[11] 4,073,121
[45] Feb. 14, 1978

[54] FORM, FILL AND SEAL INDUSTRIAL BAG MACHINE

[75] Inventors: Eddie Lee Greenawalt; Lorenzo Dow Geren, both of Lake Jackson, Tex.

[73] Assignee: The Dow Chemical Company, Midland, Mich.

[21] Appl. No.: 762,682

[22] Filed: Jan. 26, 1977

Related U.S. Application Data

[60] Continuation of Ser. No. 572,594, April 28, 1975, which is a division of Ser. No. 460,864, April 15, 1974, Pat. No. 3,925,963, which is a continuation-in-part of Ser. No. 347,923, April 4, 1973, abandoned.

[51] Int. Cl.² .......................... B65B 9/12; B65B 31/00
[52] U.S. Cl. .................................................. 53/112 A
[58] Field of Search .......... 53/22 A, 22 B, 28, 112 A, 53/112 B, 180 M, 182 M; 93/14, 17–20, 35 SB, 82, 84 TW; 141/65

[56] References Cited

U.S. PATENT DOCUMENTS

| | | | |
|---|---|---|---|
| 2,385,897 | 10/1945 | Waters | 53/180 M |
| 3,040,490 | 6/1962 | Virta | 53/22 A |
| 3,548,563 | 12/1970 | Leasure | 53/28 |

Primary Examiner—Robert Louis Spruill
Attorney, Agent, or Firm—Burke M. Halldorson

[57] ABSTRACT

Side gusseted industrial bags are continuously (or intermittently) formed from continuous web materials, and simultaneously filled and sealed in one fast operation by the method and apparatus of this invention. The various features of the invention include a tube former which wraps the web about a shaped filling mandrel most preferably with the assistance of an air bearing, registration and tension controls to accurately maintain the register of the web in relationship to printed blocks or indicia; evacuation steps to neatly gusset the bag with or without mechanical assistance, to tighten the bag firmly about the product, and to continuously wash the inside welding surfaces thereof with a cleansing high velocity air stream to thereby retain such surfaces in a more virgin or noncontaminated welding condition; filling steps that are practiced to provide a free margin of material at the top of the bag to complement the welding and gusseting steps; and hot gas welding and chilling techniques that can provide tough welds or seals with high repeatability, and which are able to withstand the shock or weight of the product load with sufficient immediacy to enable fast production cycles.

16 Claims, 34 Drawing Figures

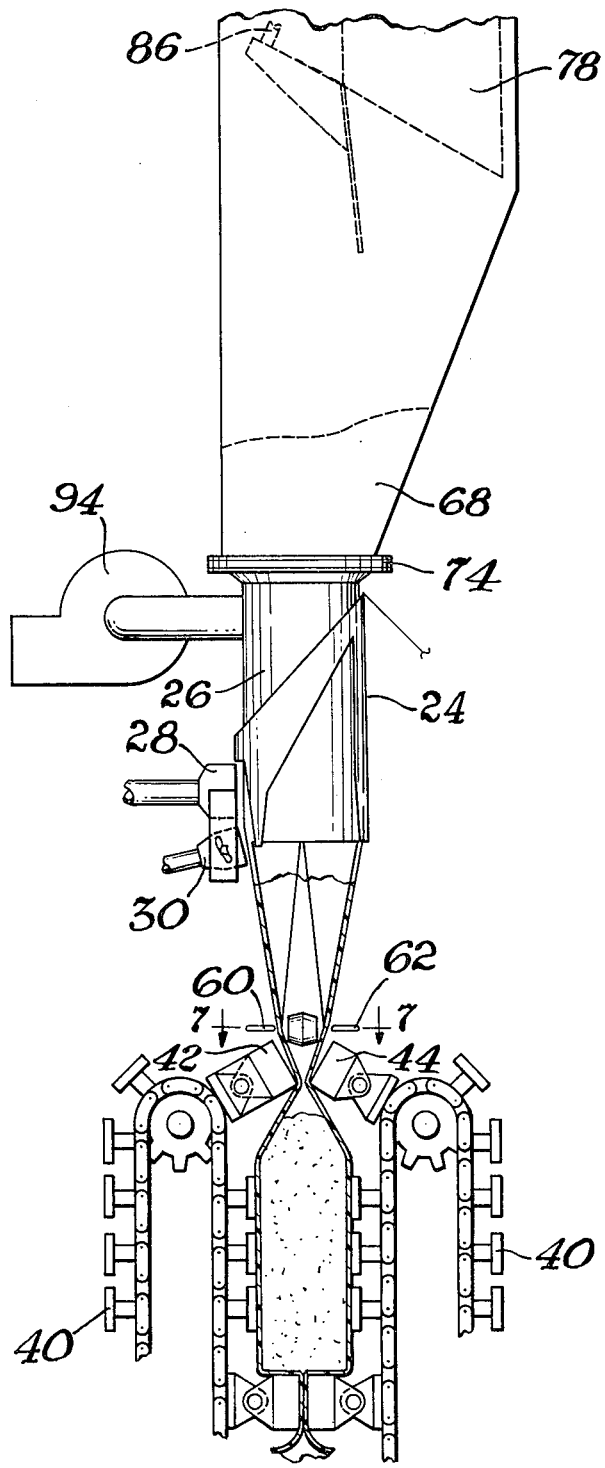
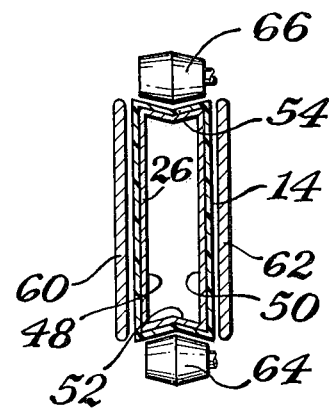
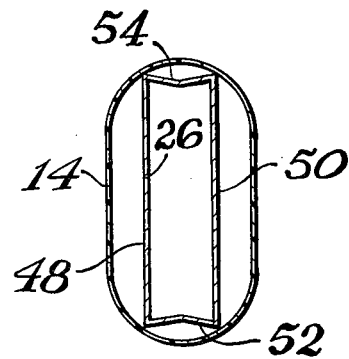
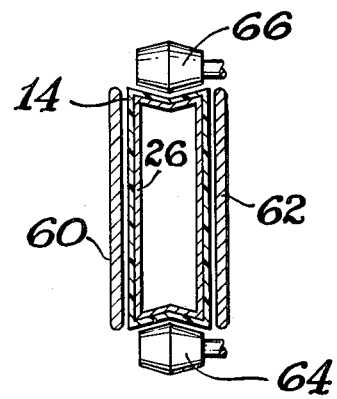
Fig. 4
Fig. 5
Fig. 6
Fig. 7

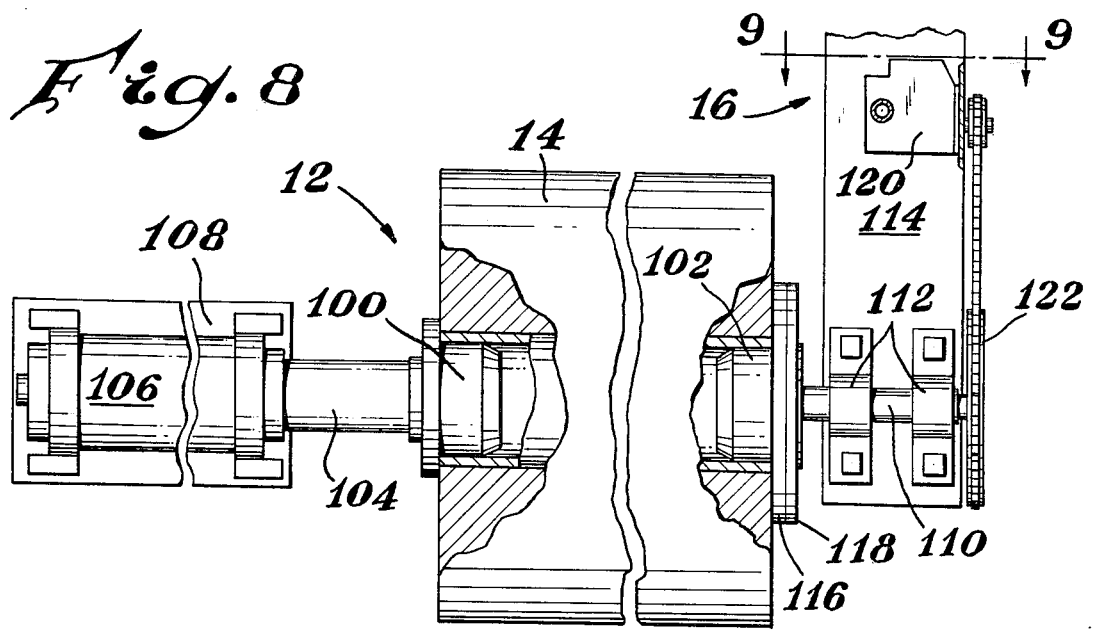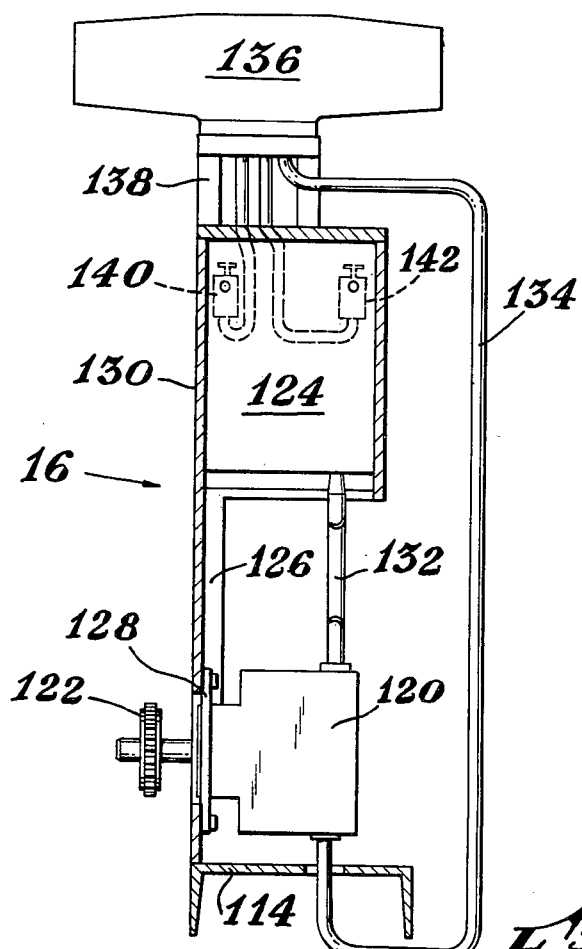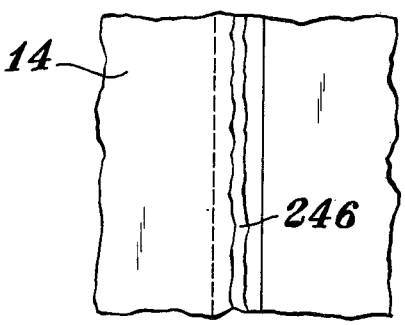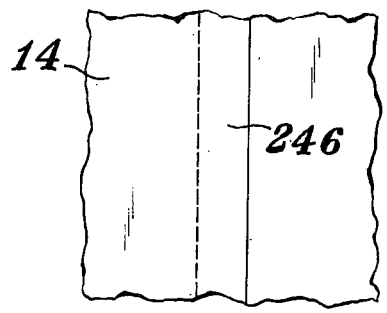

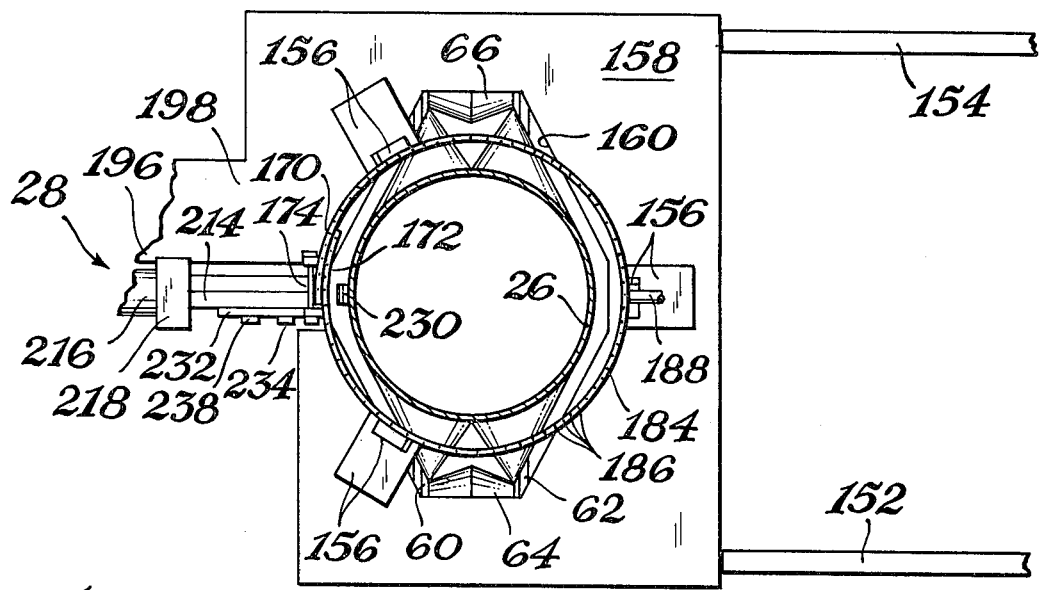
Fig. 12
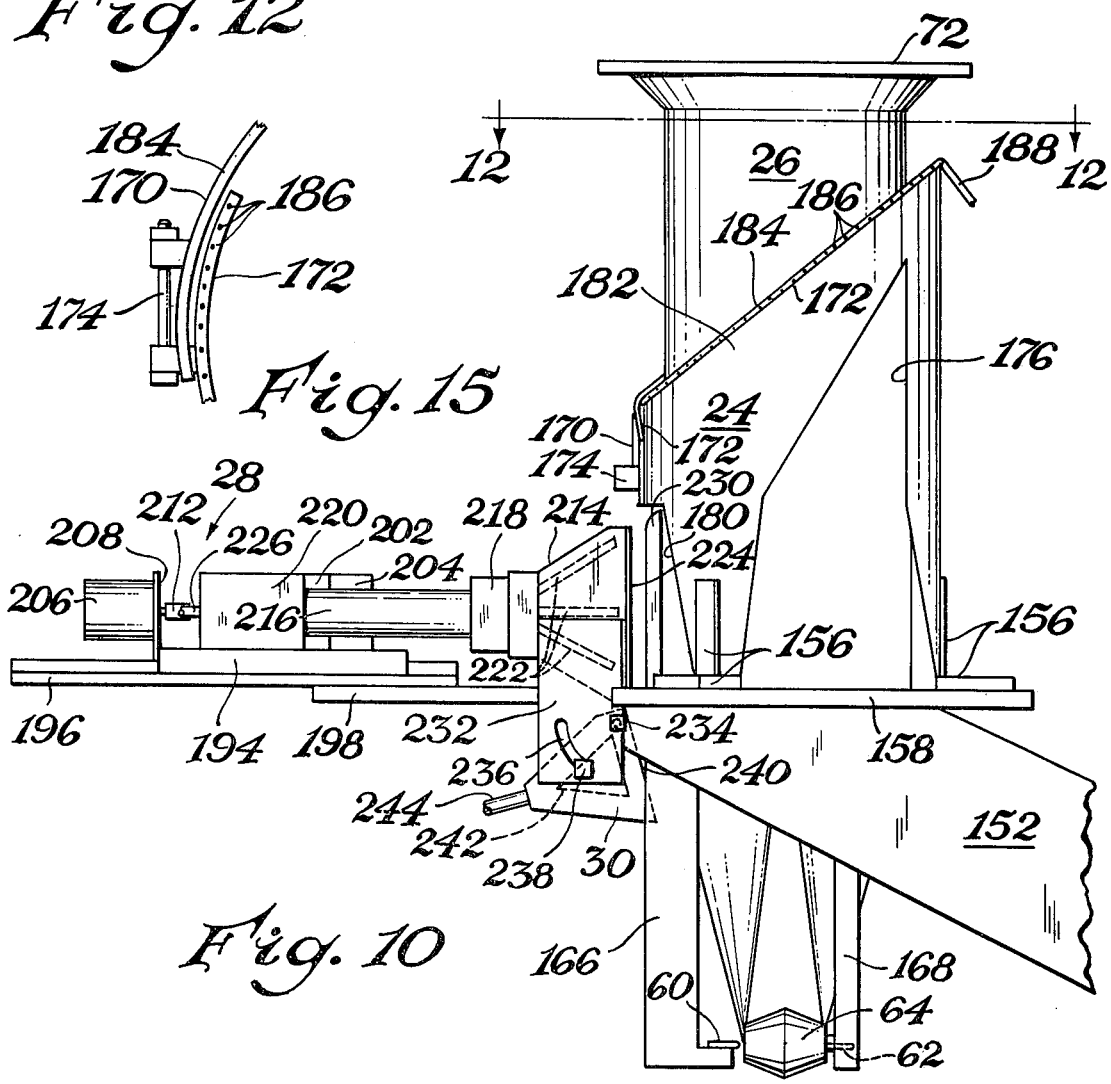
Fig. 15
Fig. 10

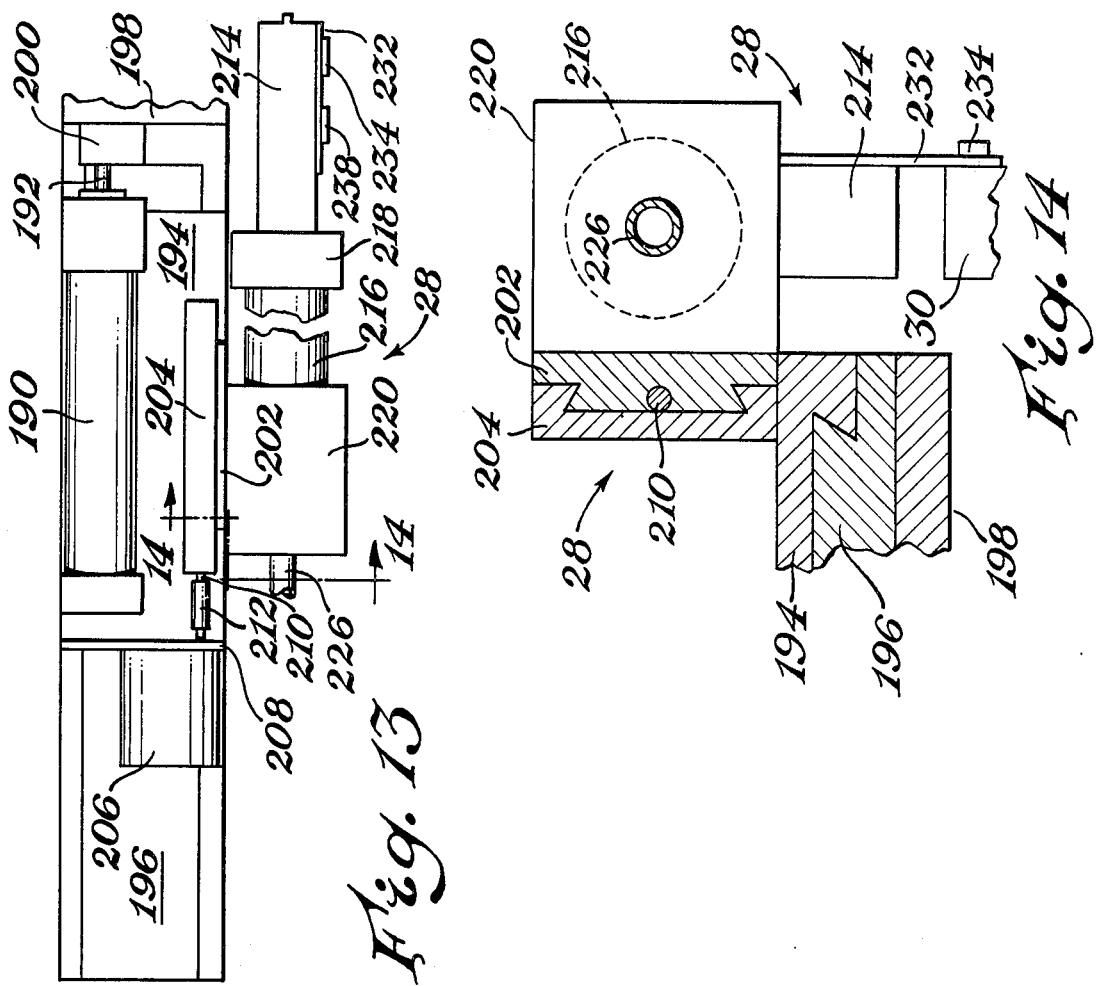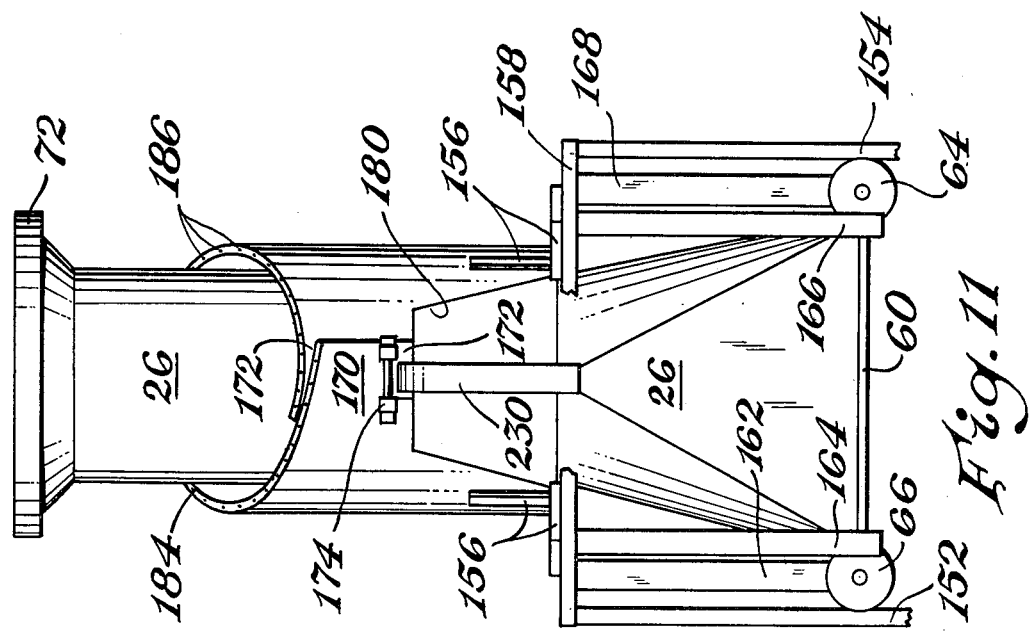

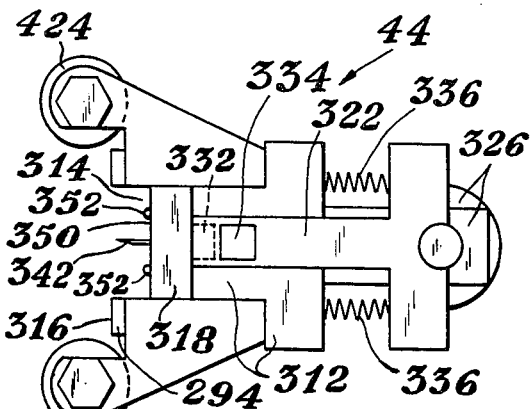
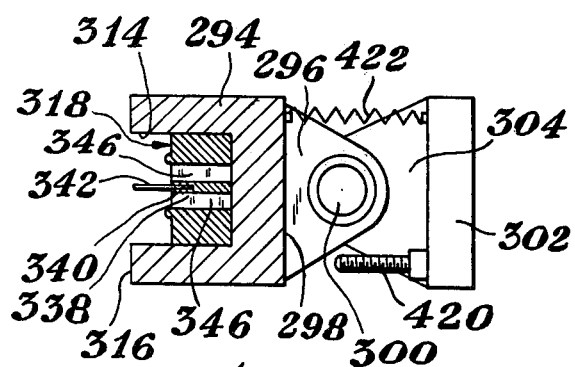
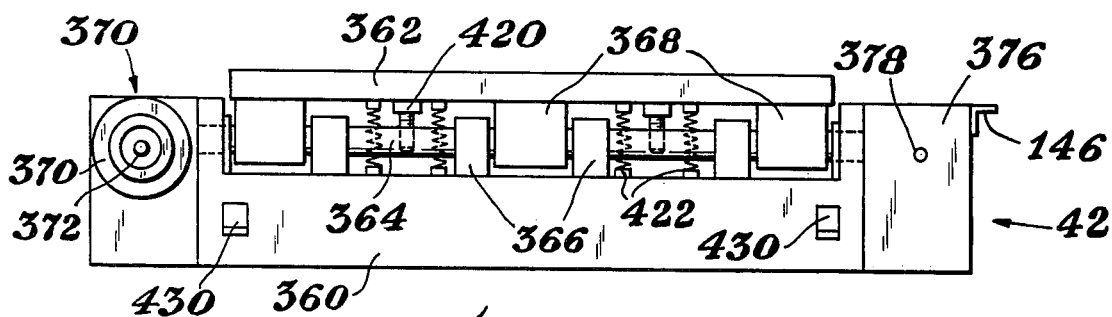
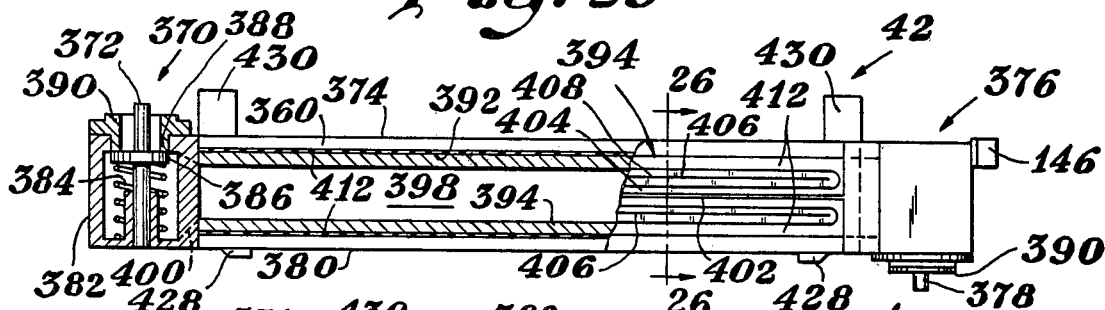
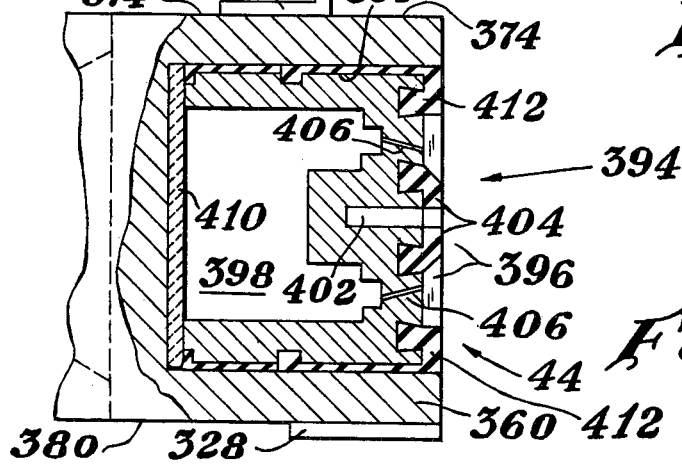

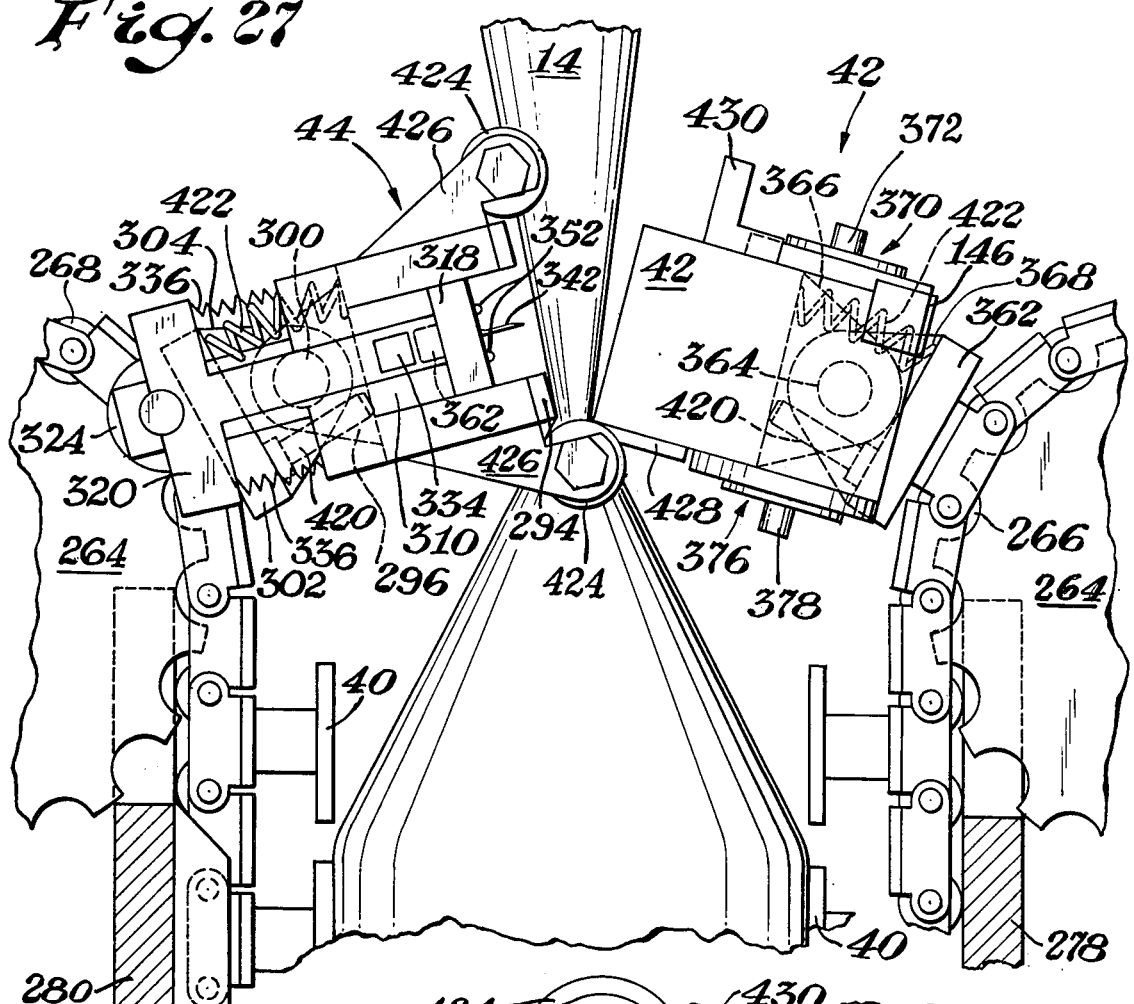
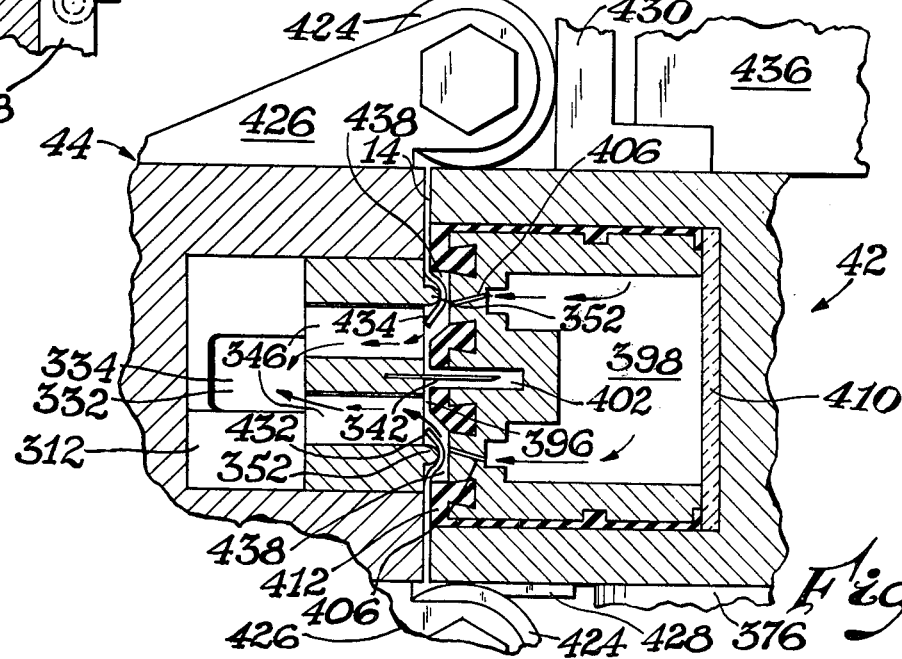
Fig. 27
Fig. 28

FORM, FILL AND SEAL INDUSTRIAL BAG MACHINE

CROSS-REFERENCE TO RELATED APPLICATION

The present application is a continuation of copending application Ser. No. 572,594, filed Apr. 28, 1975, which is a divisional application of prior application Ser. No. 460,864, filed Apr. 15, 1974, now U.S. Pat. No. 3,925,963, which in turn is a continuation-in-part of application Ser. No. 347,923, filed Apr. 4, 1973 and now abandoned.

BACKGROUND OF THE INVENTION

A bag that is 25 or more pounds (11.35 kgs) in weight is normally classed as a heavy duty or industrial size bag. This class bag enjoys tremendous packaging and shipping usage throughout the world. Nearly all or all of the industrial bags produced commercially prior to this invention have been based on a preformed or premade bag construction.

It would amount to very meaningful cost savings, however, if heavy duty bags could be produced on a fast in-line operation, based on a form, fill and seal concept. The prior art, however, has not provided the technical progress that is needed in order to make a sure and widespread transition from the preformed, to an in-line formed, filled, and sealed industrial bag.

Perhaps the most crucial problem, if viable technical progress is to be made, is the need for improved methods and apparatus for forming the bag seals or welds. Achieving good sealing results has been a past problem even as regards preformed plastic bags which require only a minimum of sealing after filling, the majority of the seals having been pre-made by the bag manufacturer under controllable, essentially stress free, ideal conditions. For example, in the Mar. 1968 issue of Food Engineering, it is reported at page 116 that:

"Bag damage with the all-plastic bag was considerable due to failure of the heat-sealed closure. The closure would open in transit, and that would be that. This isn't a product that can be recoopered."

The welding of heavy duty form, fill, and seal industrial bags is understandably even more touchy, since the process does not have the benefit of ideal bag manufacturing conditions. There is not the luxury of being able to form and cure the seals or welds in a stress free environment. Moreover, the fresh welds must accept the stress and distortions of the product load almost immediately, and must be formed with extremely high repeatability and good results for commercial acceptance. Still further, the welding technique must be able to securely weld through heavy gusseted areas if it is to achieve true success. A gusseted bag is relatively square and provides a stable pallet load, and it is essential that an industrial bag have this quality if it is to be an optimum bag. For illustrative example, a bag of 10 mil wall thickness would be 40 mils thick in the gusseted areas, 30 mils thick along the overlap or longitudinal seal, and 20 mils thick in other areas. The welding technique must accommodate such wide variances in thickness along a single weld line. Particularly, it must form a tough weld even at the points of abrupt thickness change, and without causing delineated lines of pronounced weakness or thinning.

The method and apparatus for properly side gusseting the formed, filled and sealed industrial bags is another problem area. For example, in a form, fill and seal process, the side gussets must be formed after the bag has been influenced by the distortion and weight of the product load, whereas, in a preformed bag, the side gussets can be neatly tucked in and secured under far more compatible conditions. Particularly if a form, fill, and seal industrial bag is to be optimally suited for commercial use, i.e., palletizing, there must be provisions for including functionally adequate side gussets in the ultimate bag structure.

Still further, the desired method and apparatus for producing an acceptable form, fill and seal industrial bag, should advantageously provide for flexibility in the materials from which the bag can be formed. The ultimate performance of an industrial bag, of course, depends on the materials from which it is manufactured. It is extremely desirable, for example, that in some uses, the industrial bag can be provided with multiple plies of material to better absorb the expected handling abuses. Most desirably, therefore, the operation should be sufficiently flexible to permit the usage of webs of multiple plies of material, together with tough scrim layers such as of fabric, nylon, rayon, and the like, that give the bag improved overall integrity. A multi-layer bag is generally felt to be tougher than a single ply bag of equivalent thickness, and the scrim layers can add considerable abuse resistance to the bag.

As yet another factor to be dealt with, a prospective form, fill, and seal method and apparatus for industrial bags should, for optimum versatility, expediently prepare the bag for a post-shrinkage step. This flexibility will permit the bag to be tightly shrunk about the product so that it retains a firm, tight character through a normal or even extended use period.

Accordingly, it is the primary objective of this invention to provide an apparatus and method suitable for in-line forming, filling, and sealing of industrial size bags.

It is particularly among the objectives of this invention to accomplish the primary objective with a maximum of finesse and flexibility, whereby the method and apparatus are advantageously designed to:

i. form exceedingly tough welds with a very high degree of repeatability, that can withstand the abuses of commercial handling with an acceptably low frequency of failure, and, that can withstand the weight of the product load with sufficient immediacy to enable fast production rates;

ii. permit manufacture of side gusseted bags with optimum palletizing and handling characteristics, and wherein the welding procedure is able to weld through and secure the gussets strongly in the bag structure;

iii. handle excessively dusty products of the type that normally give problems through contamination of welding surfaces;

iv. optimize the palletizing and handling characteristics of the bag and minimize material usage, by forming a tight, firm bag about the product;

v. automatically precondition the bag for a post-shrinkage step;

vi. achieve finesse in holding and maintaining proper registration so that the bags can be produced with accurate registration of printed blocks and indicia thereon; and vii. fill the bags in a manner that complements the welding and gusseting of the bag with repeatedly good results, and that facilitates the performance of these objectives at commerically acceptable manufacturing speeds.

Other objectives, aspects, and advantages of the invention will in part be pointed out in, and in part apparent from, the following description considered together with the accompanying drawings, in which:

FIGS. 2 through 4 are views like FIG. 1, which are used to illustrate the process of the apparatus thereof, particularly in the sense of showing progressive stages in the filling cycle of such apparatus;

Figure 1:
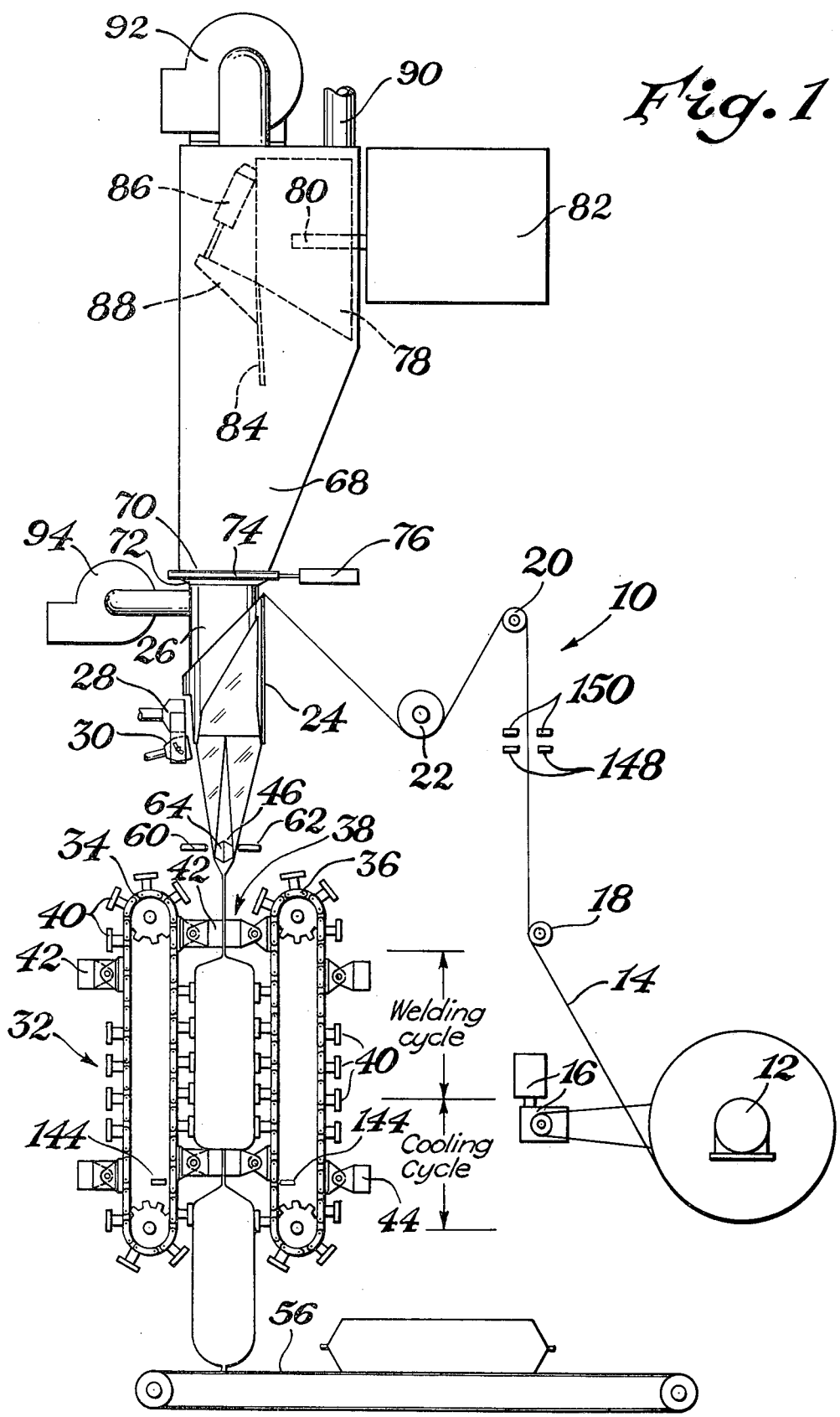
FIG. 1 is a side elevational view illustrating apparatus for forming, filling, and sealing industrial class bags in accordance with the general teachings and principles hereof, certain parts of the apparatus being shown in this view in generally abbreviated or schematic detail.
Figure 2:
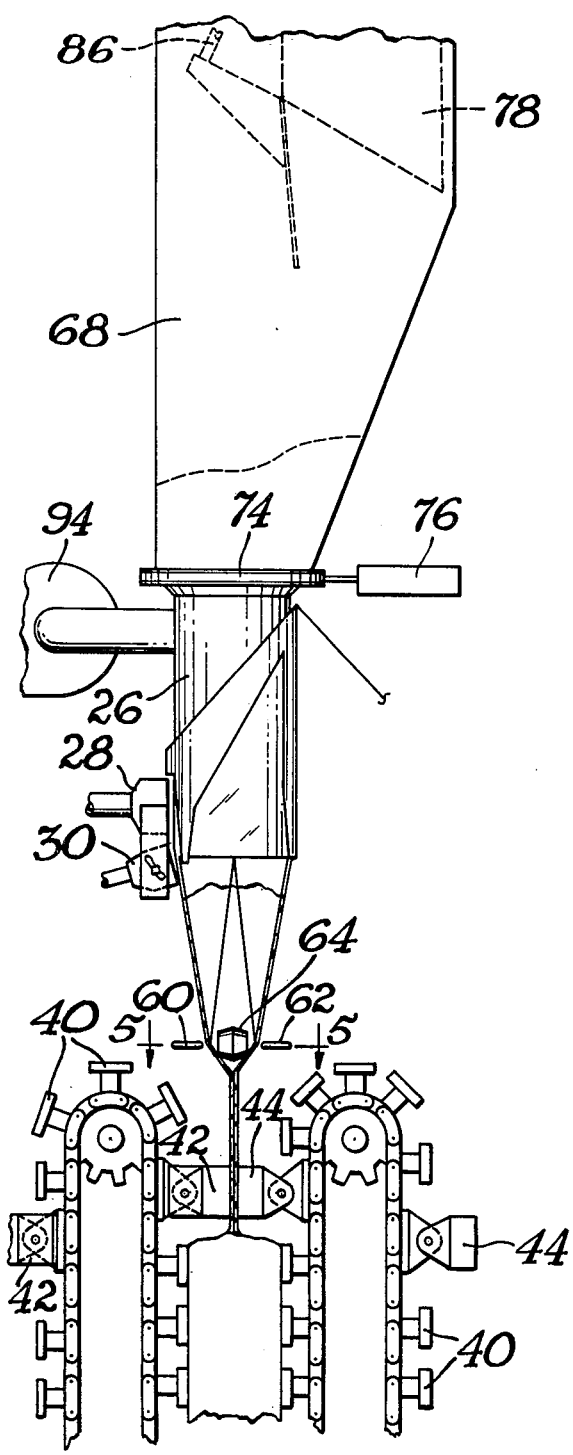
Figure 3:
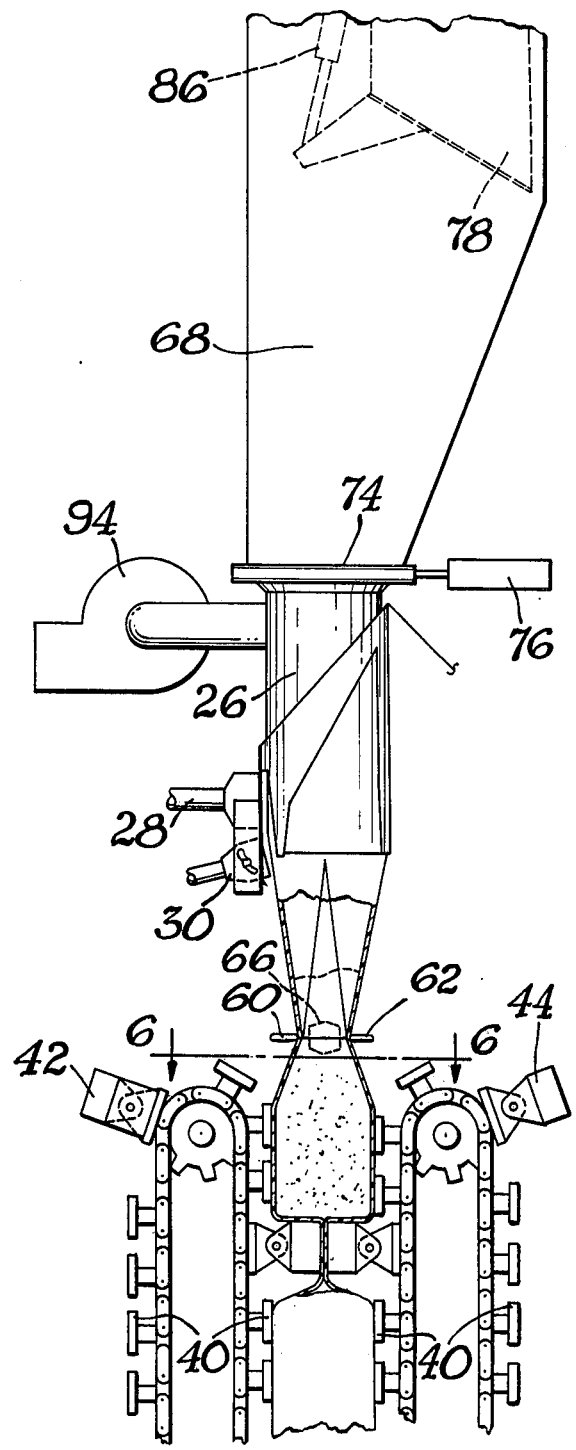
Figure 18:
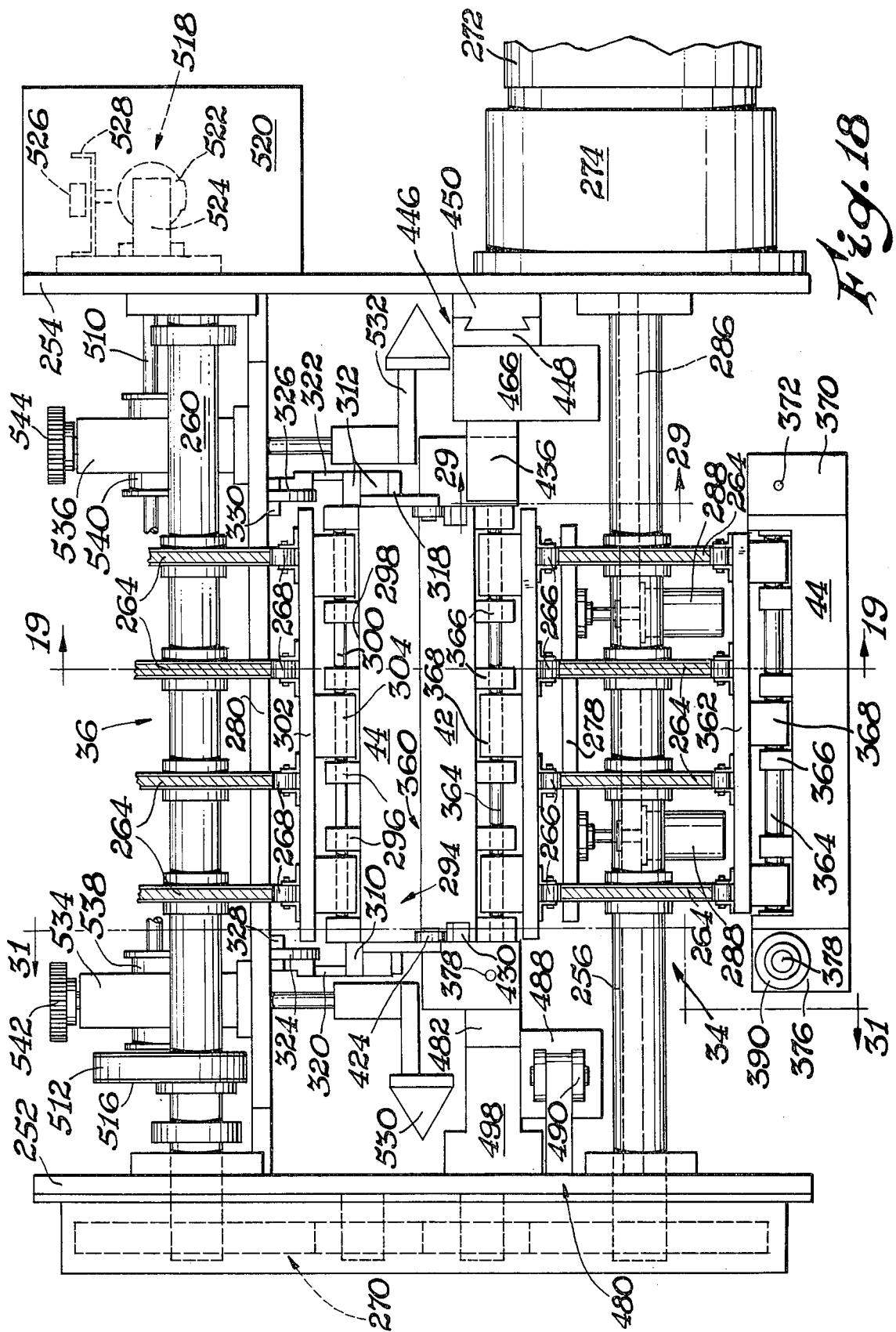
Figure 19:
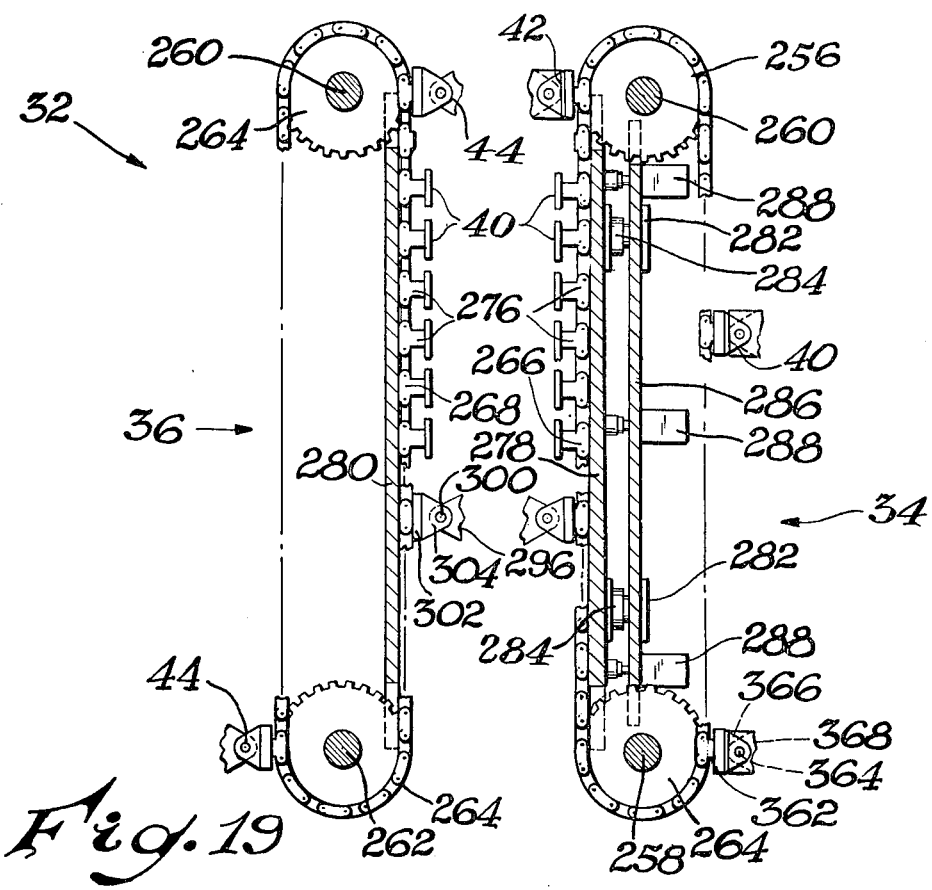
Figure 20:
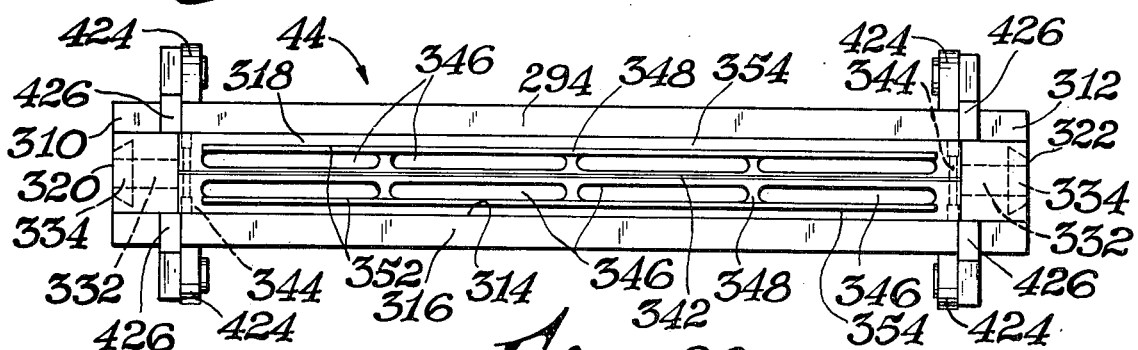
Figure 21:
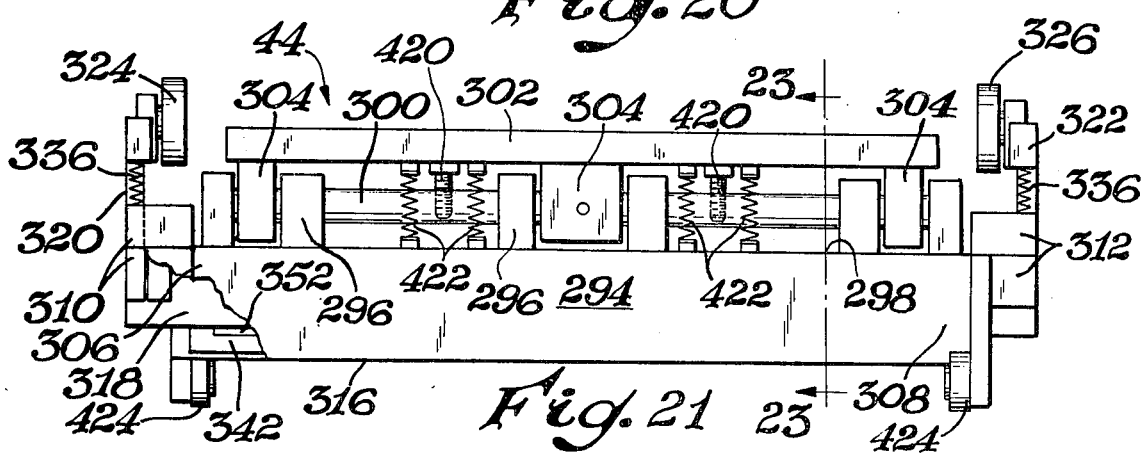
Figure 29:
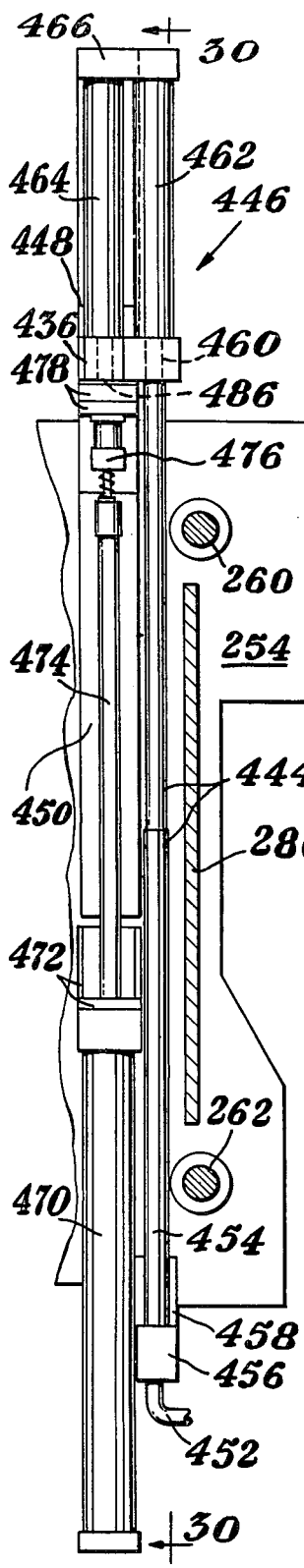
Figure 30:
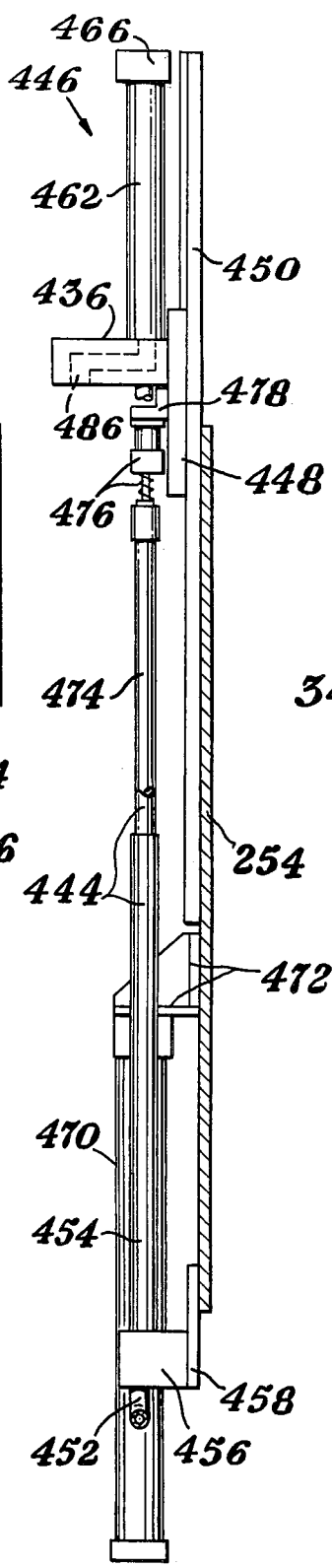
Figure 33:
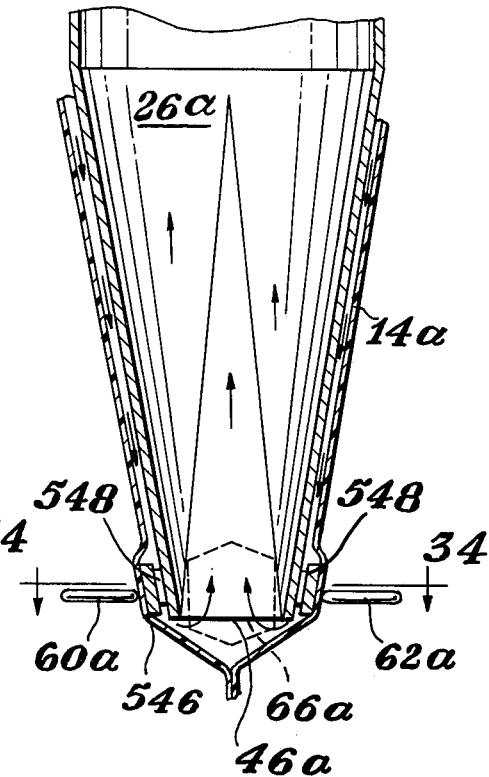
Figure 34:
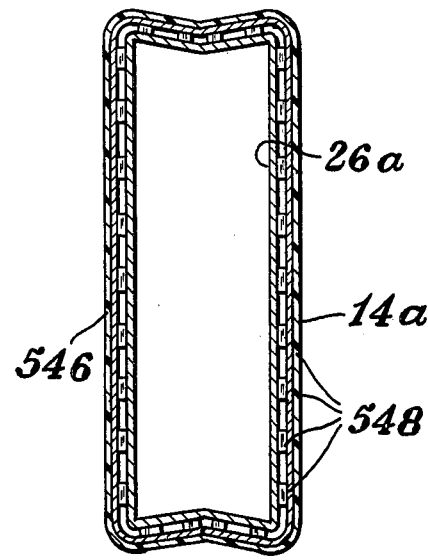
Figure 31:
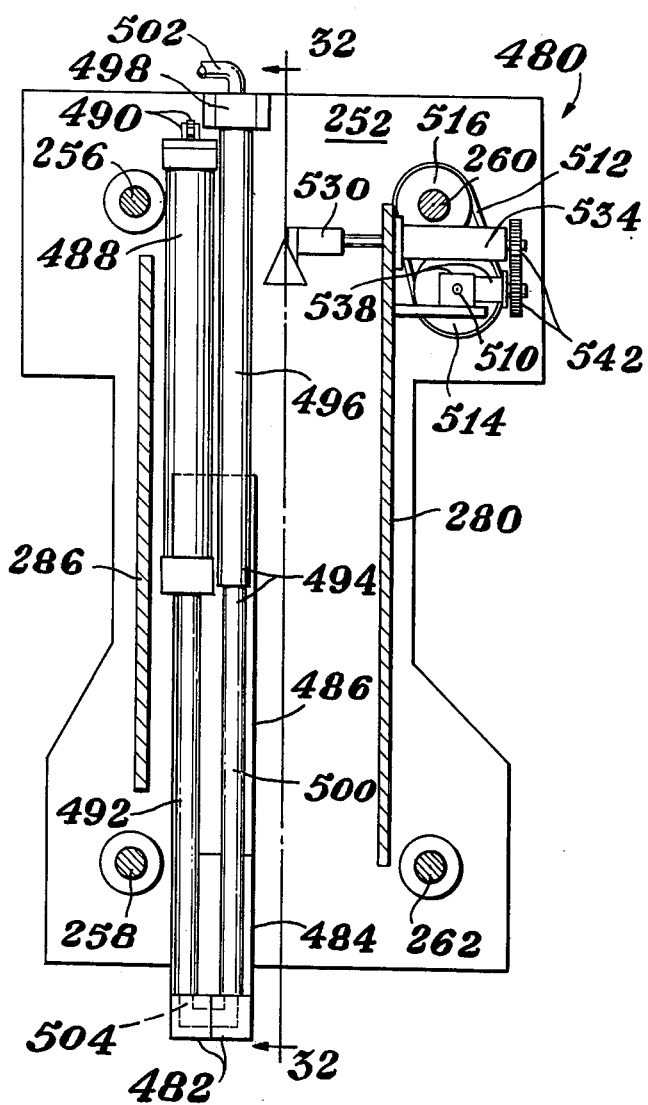
Figure 32:
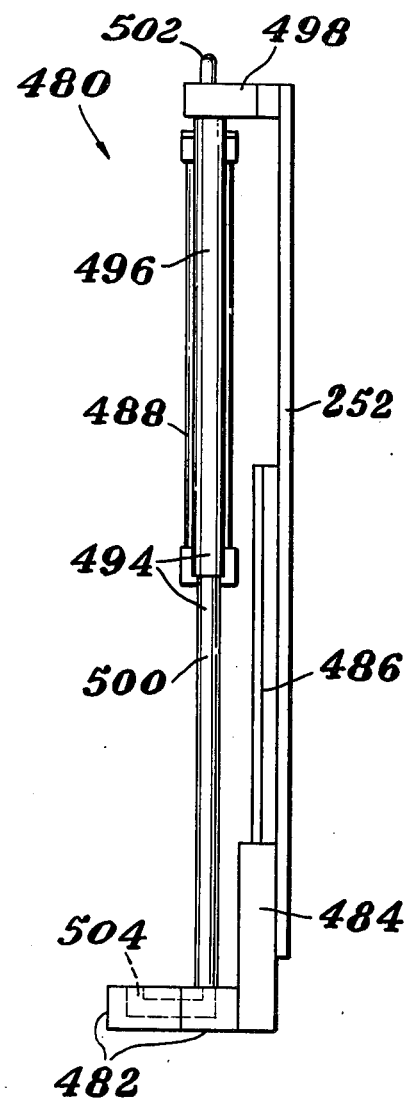

FIGS. 5 through 7 are cross-sectional views through FIGS. 2 through 4, respectively, taken along reference lines 5—5, 6—6, and 7—7, respectively;

FIG. 8 is a plan view which illustrates in somewhat more thorough detail, the preferred embodiment of the unwind assembly from which a continuous web is fed to form the bags, and also partially shows the drag inducing or applying unit associated therewith for automatically varying and controlling the tension on the web;

FIG. 9 is essentially an elevational view that illustrates the drag applying unit as viewed along reference line 9—9 of FIG. 8;

FIG. 10 is a side elevational view which illustrates in somewhat more thorough detail, the preferred embodiments of the filling mandrel, tube former, and vertical seam welder of the apparatus of FIG. 1;

FIG. 11 is a front elevational view of the apparatus as shown in FIG. 10, except with the vertical seam welder having been broken away and not illustrated in this view;

FIG. 12 is a cross-sectional view taken along reference line 12—12 of FIG. 10, and essentially comprises a plan view of the apparatus as shown in FIG. 10;

FIG. 13 is a plan view of the vertical seam welder of FIG. 10;

FIG. 14 is a cross-sectional view of the vertical seam welder of FIG. 13, taken along reference line 14—14 thereof;

FIG. 15 is an enlarged, partial view showing the air bearing and adjusting clamp of the tube former;

FIG. 16 illustrates the vertical weld formed in the bag in a condition immediately after is passes the vertical seam welder and associated chilling head; and FIG. 17 shows the same weld after having been subjected to the shock of product load, whereby essentially all wrinkles are removed from the weld and an invisible or near invisible weld line is achieved;

FIG. 18 is a plan view which illustrates the apparatus of FIG. 1 in more thorough detail, this view looking down into the bag sizing cage of the apparatus;

FIG. 19 is a cross-sectional view taken along reference line 19—19 of FIG. 18, and illustrates particularly the floating pressure plate employed to control the clamping pressure in the bag sizing cage;

FIGS. 20, 21, and 22 are front elevational, plan, and end views, respectively, which illustrate in more thorough detail, the preferred embodiment of one of the co-acting sealing heads of the apparatus of FIG. 1, a portion of FIG. 21 being broken away to reveal the moveable cutter head carried by this sealing head;

FIG. 23 is a cross-sectional view through FIG. 21, taken along reference line 23—23, thereof;

FIGS. 24 and 25 are front elevational and plan views, respectively, which illustrate in more thorough detail, the preferred embodiment of the opposite co-acting sealing head of the apparatus of FIG. 1, a portion of FIG. 24 being broken away particularly to illustrate the detail of the hot and cold gas valves included in the design of this sealing head;

FIG. 26 is a cross-sectional view through FIG. 24, taken along reference line 26—26, thereof;

FIG. 27 is a partial side elevational view particularly illustrating the co-acting sealing heads at a moment just prior to their engagement to form the end welds of the bag in accordance with the FIG. 1 apparatus and process thereof;

FIG. 28 is a cross-sectional view showing the engaged co-acting sealing heads at a moment in the welding cycle when a hot gas stream is being applied thereby to form the end welds on the bags;

FIG. 29 is a cross-sectional view partially through FIG. 18, taken along reference line 29—29, thereof, and particularly illustrates the preferred assembly for delivering hot welding gas to the sealing heads;

FIG. 30 is a cross-sectional view through FIG. 29, as taken along reference line 30—30, thereof;

FIG. 31 is a cross-sectional view through FIG. 18, taken along reference line 31—31, thereof, and particularly illustrates the preferred assembly for delivering cooling gas to the sealing heads, together with the structure of one of the two revolving gusseting arms for providing mechanical assistance in side gusseting bags made according to the FIG. 1 apparatus;

FIG. 32 is a cross-sectional view through FIG. 31 as taken along reference line 32—32, thereof;

FIG. 33 is an enlarged partial view which illustrates a modification to the filling mandrel designed to create a high velocity stream to continuously wash over the inside surfaces of the bag;

FIG. 34 is a cross-sectional view through FIG. 33 as taken along reference line 34—34 thereof;

INTENT CLAUSE

Although the following disclosure offered for public dissemination is detailed to ensure adequacy and aid understanding, this is not intended to-prejudice that purpose of a patent which is to cover each new inventive concept therein no matter how it may later be disguised by variations in form or additions of further improvements. The claims at the end hereof are intended as the chief aid toward this purpose, as it is these that meet the requirement of pointing out the parts, improvements, or combinations in which the inventive concepts are found.

DESCRIPTION OF THE ILLUSTRATED EMBODIMENTS

A general teaching of the illustrated apparatus and process hereof is described in relation to FIGS. 1 through 7. Referring first to FIG. 1, apparatus generally designated as 10, includes an unwind assembly 12 which rotatably mounts a rolled up web 14 of single or multiply, thermally sealable material. The web is continuously drawn off the unwind assembly at a constant rate by means to be described and under tension which is controlled automatically by a drag applying unit 16. The web is initially directed generally upwardly about idler feed rolls 18 and 20 to an idler approach roll 22. The approach roll feeds the web at a controlled angle to a tube former 24, from whence it is drawn downwardly therethrough. The tube former continuously wraps or rolls the web about a hollow filling mandrel 26 to provide a continuous vertical tube having its marginal or longitudinal edges overlapped. The overlapped edges are continuously welded together by a hot gas, vertical seam welder 28. The fresh weld or seal is generally immediately partially cured by an impinging cooling gas supplied through a chilling head 30 mounted underneath seam welder 28.

The tube is then drawn through a bag sizing cage 32. The sizing cage includes opposed, continuous chain assemblies or vertical conveyors 34 and 36, which are spaced to define a vertical cavity 38 through which the tube passes. The conveyors have mounted thereto and convey a continuous series of slats 40 which define the effective width of cavity 38; and also mount and convey a predetermined number of coacting sealing heads 42 and 44, respectively. The sealing heads regularly come together to mate at a point below the lower terminating end of the filling mandrel, and grasp the tubing therebetween, each time forming a temporary bottom, while continuously drawing or pulling the tube downwardly to provide successive product receiving spaces in the tube. Simultaneously the sealing heads transversely cut and weld the tubing at regular intervals and cool the welds, before disengaging and being returned to repeat this cycle. The bags as they are manufactured, are deposited onto a horizontal conveyor belt 56 operating underneath the sizing cage.

The bag filling mandrel 26 is arranged generally concentrically within, and extends axially both above and below the tube former. In the region of the tube former and thereabove, the filling mandrel is of cylindrical cross-sectional shape. Beginning near the lower extent of the tube former, the filling mandrel gradually changes to an ultimate configuration at its terminating lower end portion 46, as seen in FIGS. 5-7 (see also FIGS. 10-12). The end portion 46 comprises opposed, generally flat sidewalls 48 and 50 connected by opposed, inwardly formed V-shaped end sections 52 and 54. This transformation in shape is to assist gusseting the tube in a manner as will be described. Also to this purpose, end portion 46 is peripherally bounded by horizontal restraining elements or means comprising horizontal restraining bars 60 and 62, extending in close parallel relationship with sidewalls 48 and 50, respectively; and gusseting rollers 64 and 66 disposed partially within the inwardly formed end sections 52 and 54, respectively.

A product holding chamber 68 is affixed to the top of the filling mandrel through means of flanged ends 70 and 72 in these pieces, respectively. The holding chamber communicates with the filling mandrel through a slide gate 74 operated through an air cylinder 76. The holding chamber contains a dump bucket 78, which is suspended by attachment to the arms 80 (only one showing) of a weighing scale 82. The dump bucket is released by a hinged bottom trap door 84, through an air cylinder 86 and bracket connection 88. An electronically controlled surge hopper, shown partially at 90, or another suitable product introducing means, is connected into the top of the holding chamber. The holding chamber is adapted to be evacuated by a high capacity, low vacuum evacuation fan 92. The filling mandrel is adapted to be evacuated, independently of the holding chamber, by a high vacuum, low capacity evacuation fan 94.

The repetitive filling cycle of apparatus 10 is initiated by the transfer of product from the surge hopper into the dumping bucket. The scale 82 automatically weighs the product and at the proper moment electronically signals the surge hopper to gate closed. The weighed product load is then dumped from the bucket onto slide gate 74 where it remains for a brief holding interval. During this interval, the product load is subjected to an evacuation step drawn through fan 92. Preferably both the fans 92 and 94 operate continuously to minimize cycle times. The evacuation of the holding chamber serves the purpose of removing entrained air from the product load. In order to optimize this end result, the holding chamber is preferably evacuated to the maximum extend compatible with the limits of subsequent bag filling steps. These limits are determined mostly by the kinetic energy available from dropping the product load from the elevation of the slide gate. The product load, briefly, must have sufficient energy to quickly "shock" or "pop" the tube open and be received therein in proper timing to the mating of the sealing heads, as will be explained more fully hereinafter.

The remainder of the filling cycle is shown progressively in FIGS. 2 through 5. In the FIG. 2 illustration, the product load is shown deposited on the slide gate at the instant just prior to dumping. The holding chamber and the filling mandrel are both under internal evacuation. The degree of vacuum is greater in the filling mandrel due to the relatively higher vacuum draw capability of fan 94. The tube at this instant is sucked tightly against the sides of the filling mandrel, and is collapsed tightly upon itself therebelow due to the inward bearing of atmospheric pressure.

FIG. 3 illustrates the filling cycle after opening slide gate 74, and initial entry of the product load into the tube. An instant after the slide gate opens, the lower vacuum maintained in the holding chamber tends to dominate over the filling mandrel to partially relieve the vacuum induced stress on the tube. The stress if momentarily relieved at least sufficiently for the energy of the product load to open the collapsed tube, and for the product load to be received quickly therewithin. The evacuation fan 94 is designated as a low capacity fan in the sense that this fan does not have the capacity to recover fast enough after the slide gate opens, to prevent the necessary degree of relief on the tube. The energy of the product load is essentially the energy of the elevational drop of the load, as influenced by the downward sucking effect applied to the product load by the unbalanced vacuum pressures in the filling mandrel and holding chamber at the instant the slide gate is opened. This energy must overcome the pressures bearing inwardly on the tube, and most optimally distends the tube sufficiently to fully accept the product load before the entirety of the bag has passed the filling mandrel. The mandrel will in this manner shield the upper welding surfaces of the bag from direct engagement with the product. Inherently also, the product load is momentarily packed toward the bottom of the bag, in a position to be forced upwardly by the squeezing action of the sizing cage, as will be explained more fully hereinafter. The timing of this latter step provides the momentary condition of a margin of free space at the top of the bag, thereby lessening any chance of an interference between the product load and the sealing heads. By the same token, the bag is made more receptive to the formation of neat appearing side gussets therein by a procedure to be described. The consequence that must be avoided, in any event, is backup of the product load into the filling mandrel to any extent as would cause a delayed filling action, whereby product would dribble from the mandrel, and become interposed between the sealing heads at the instant the same close or clamp across the tube.

The filling cycle is shown toward its last stages in FIG. 4. The sealing heads 42 and 44 are ready to engage underneath the mandrel to form the top end of the bag of this discussion, and simultaneously the bottom end of the bag next to be filled. The slide gate 74 is closed, and a new filling cycle is already in process.

With the gate 74 in the closed position the high vacuum fan 94 dominates over the filling mandrel to evacuate preferably as much air from the bag as is possible before the sealing heads close. The object is to tighten and firm up the bag to impart acceptable, and preferably optimum palletizing and handling characteristics thereto. Moreover, a firm bag uses less material, and the product load is in a sense densified by the evacuation steps so that it requires less packaging space. Air is more quickly removed from the top of the bag up to a certain depth into the product. However, because of an inherent pressure drop through the product, the removal of entrapped and entrained air from the bottom area of the bag is hampered. The first vacuum stage applied in the holding chamber, therefore, preconditions the product to better achieve the sought after objectives, under the conditions of fast, economical cycle times.

Simultaneously, in controlled relationship with the timing or closing of the sealing heads, the sizing cage is acting to urge the product upwardly into the top portion of the bag. The sizing cage, overall, causes the product to flow and redistribute more evenly within the bag to give better shape and size uniformity thereto, and to negate internal void areas. The width of the sizing cage and its position is necessarily balanced with the various factors controlling the upward flow of the product, in order that this step is compatible with the movement and clamping of the sealing heads.

The evacuation procedure described above is also used to form neat, shape imparting gussets to the bag simultaneously with its formation. Further on herein, it will be described how this same step can be employed, in a modified practice hereof, to wash air over the inside surfaces of the tube, to avoid weld or seal contamination by product dust when such is a problem.

However, referring specifically to the formation of the gussets, this procedure is depicted in FIGS. 5-7. These figures are tied in time to FIGS. 2-4, respectively, to which they relate as cross-sectional views. In FIG. 5, the tube is in a condition where it is pulled by vacuum force tightly and flatly against the lower terminating end portion 46 of the mandrel, imparting thereto a relatively neat gusseted configuration having essentially inwardly collapsed or inwardly tucked opposed side portions as will ultimately comprise the gusset structure of the bag.

The subsequent shock of the dumped product load momentarily pulls the tube away from the mandrel as shown in FIG. 6. The memory of the gusseted shape, however, is retained in the tube by means of peripheral restraint applied to the tube through restraining bars 60 and 62, cooperatively with gusseting rollers 64 and 66. The memory permits or encourages the gussets to properly and neatly reform after each dump, as the tube recovers and is sucked back tightly against the filling mandrel, as seen in FIG. 7. In the preferred embodiment the shaped mandrel, with the assistance of the draw on the tube, thereby extends the gusseted structure into the area of the sealing heads 42 and 44 which permanently weld the gussets into the bag as it is formed.

The gusset structure, added to the bag by practice of the above cooperating restraining and vacuumizing steps, serves to square-up the bag giving it even better appearance, together with yet even further improved stackability or ability to be palletized. Despite the fact that the gusset structure is permanently formed only after the tube has been highly stressed and filled, the gussets are surprisingly neat and strong due to the manner in which the bottom and top welds are formed securing the gussets. The welding technique is described in some depth hereinafter. As a general matter, however, the sealing heads first cut the tube. The cut edges are then "bathed" in a directionally controlled stream of hot air or other gas, through a welding cycle shown in FIG. 1, after which the edges are bathed with cooler air for a short period as also denoted in the same FIG. 1. No mechanical pressures are applied to the seal such as would cause delineated lines of thinning or objectionable preferential rupture lines. The welding technique is particularly able to accommodate welding across varying numbers of plies of material, as is the case with a gusseted tube, and form a strong weld at every interface.

UNWIND ASSEMBLY AND DRAG APPLYING UNIT

The unwind assembly 12 and drag applying unit 16 are shown in more complete detail in FIGS. 8 and 9. The rolled up web 14 is rotatably carried on opposed plugs or collets 100 and 102 which insert into the opposite ends of the core of the roll. The plug 100 is freely rotatable on the end of a shaft 104 of a footed air cylinder 106, which is, in turn, fastened to a fixed horizontal mounting 108. The air cylinder moves plug 100 in and out for changing rolls, and the pressure of the plug against the roll is determined by regulating the pressure to the air cylinder. The opposite plug 102 is attached to the end of a horizontal shaft 110. The shaft 110 is journally carried for free rotation by pillow bearings 112 secured to a fixed mounting 114. One or more annular spacers 116 are adapted to be removably affixed to a collar 118 on the back of plug 102. The removal or addition of spacers allows the operator to precisely align the center line of the web with the center line of the tube former for accurate web feed to the tube former.

A pump 120, which is part of the drag applying unit, operates off shaft 110 by means of a chain and sprocket connection 122 therewith. Unit 16 is a closed system including a fluid reservoir 124 which is elevated above the pump (see FIG. 9). The reservoir with the assistance of a bracket 126, and the pump through a flanged end 128, are commonly attached to a fixed vertical plate 130 which extends off fixed mounting 114. An inflow pipe 132 communicates between the bottom of the reservoir and the pump, and an outflow or discharge pipe 134 between the pump and a 4-way solenoid valve 136, which is affixed to the top of the reservoir through a mounting piece 138. The solenoid valve, in turn, communicates with the reservoir through a pair of variable restrictor valves 140 and 142. Fluid is continuously fed through the inflow pipe to the pump, and the discharge is returned to the reservoir via one or the other of the restrictor valves, depending on the valving position of solenoid valve 136. The restrictor valves can each be needle valve assemblies which are adjusted to provide two settings. In one setting, the pump is required to work comparatively harder to return the fluid to the reservoir than at the other setting. This determines the drag applied to the unwind assembly thus giving variable tension control over the web, i.e., comparatively low or high tension depending at any certain time through which restrictor valve the outflow from pump 120 is being diverted by solenoid valve 136.

WEB REGISTRATION CONTROL

The drag applying unit 16 is designed to automatically maintain the proper registration of printed web material. Unit 16 works in cooperation with three monitoring units or sensors, preferably electric eyes. One such electric eye 144 is placed in the sizing cage and records the event of each passage of sealing heads 42, through an offset tab 146, mounted to each head, and which breaks the circuit of this eye (see FIGS. 1 and 24). Reading this event established a point that never varies, i.e., known point. Electric eye 144 dominates second and third spaced apart electric eyes 148 and 150 positioned to read printed marks on the web as it comes off the roll.

Each time eye 144 reads the known point, it signals eyes 148 and 150 to look for a mark. If the mark is at some point between the eyes, no response is made since the web is within the registration tolerances. If the eye 150 nearest the tube former reads the mark, this indicates that the web is being over-stretched. This event signals the solenoid valve 136 to switch over to the low restrictor valve automatically lessening the tension on the web to keep the same in proper register. Conversely, if the eye 148 farthest from the tube former reads the mark, the web is being under-stretched to maintain registration, and the solenoid valve is signaled to switch the outflow of the pump through the high restrictor, automatically adding more stretch or tension to the web.

TUBE FORMER AND AIR BEARING

Referring now particularly to FIGS. 10–12 and 15, the tube former 24 is mounted by right angle brackets 156 to the top of a horizontal platform 158, and overlies a central opening 160 cut out of the platform. The filling mandrel is suspended through the tube former and opening 160 to extend below platform 158. Four vertical arms 162, 164, 166 and 168 are rigidly attached to the underside of the platform and extend downward therefrom alongside the filling mandrel. The arms 164 and 166 jointly carry the restraining bar 60, whereas arms 162 and 168 carry the opposite restraining bar 62. The arms 166 and 168 also serve to journably support the gusseting rollers 64 and 66, respectively. A pair of fixed frame arms 152 and 154 provide rigid support for the platform.

The tube former is preferably sheet metal which is formed to define a generally hollow, cylindrical body having overlapped radially spaced, vertical edge portions 170 and 172. The edge portions are bracketed together by an adjustable bracket assembly 174. Assembly 174 allows the tube former to be expanded or contracted circumferentially to permit the making of a slightly larger or smaller tube in response to variances in the bulk density of the product load. The tube former includes plural cut-outs 176 extending upwardly from its lower periphery or edge to give better flexibility to make this adjustment. Also the former is cut back at 180 underneath vertical edge portions 170 and 172 to permit almost immediate access of hot welding gas to the tube.

The top edge 182 of the tube former can be generally near parabolic in shape. However, its exact optimum shape is determined experimentally depending on the thickness and characteristics of web 14. Attached to the top edge of the tube former in the manner of a rim, is a hollow, relatively small diameter tube 184. The tube includes numerous perforations 186 to provide an air bearing over which the web is floated as it is being drawn through the former. The air bearing is continually fed by a regulated compressed air line 188, and complements fine web tension and registration control by reducing unwanted and uncontrolled friction drag forces, and minimizes any prospect of drag induced damage, breakage, or unrecoverable over-stretching of the web.

HOT GAS VERTICAL WELDER

The vertical seam welder 28 is best shown in FIGS. 10, 13 and 14. The seam welder is carried on a horizontal slide 194 which moves transversely on a fixed slideway 196. The slideway is supported off platform 158 by a rigid extension arm 198. An air cylinder 190 is mounted upon slide 194, and the arm 192 of the air cylinder is attached by a rigid bracket 200 to slideway 196. The air cylinder operates slide 194 to move the vertical seam welder to the approximate welding position, hold it there during operation, and automatically retract it to a safe distance when apparatus 10 is stopped to avoid burning the web.

Fine vernier adjustment for the exact welding position or distance from the tube is controlled by use of a vernier slide 202 moveable tranversely in a fixed slideway 204 which is attached to slide 194. The vernier slide is operated by a low speed electric motor 206 affixed by a vertical bracket 208 to the back of slide 194. The motor turns a preferably fine threaded screw 210 through a coupling 212. The screw is threaded into the vernier slide to cause and hold fine adjustments.

The vertical seam welder includes a relatively flat, vertical hot gas welding head or block 214 mounted to the forward end of a horizontal heater barrel 216 through an adapter 218. The opposite end of the heater barrel is attached to a holder 220 which, in turn, is affixed to slide 202. The welding head includes internal diverging baffles 222 to uniformly distribute the incoming gas flow to a narrow vertical slot 224 which applies the gas to the tube. The slot 224 is centered on the longitudinal center line of the overlapped edges of the tube. The heater barrel contains internal calrod gas heating elements (not shown), and receives compressed gas from a pressure regulated line 226. The filling mandrel includes an embedded vertical back-up strip 230, such as of glass impregnated Teflon ®, aligned with slot 224 to prevent sticking of the tube to the mandrel.

A plate 232 is attached to the welding head, from which the chilling head 30 is suspended by a pivot connection 234. The chilling head is adjustable for inclination with the vertical axis through means of a curved slot way 236 and tightening nut 238. The chilling head includes a narrow vertical slot 240 aligned vertically with slot 224 of the welding head, and is internally baffled at 242 to issue a generally uniform column of cooling gas through slot 240. A pressure regulated compressed air line 244 operates the chilling head.

OPERATION OF THE VERTICAL SEAM WELDER

The compressed air line feeding the hot gas block must provide sufficient velocity pressure to cause intimate contact between the interfaces of the overlapped web in order to achieve optimum sealing results. The temperature of the welding gas is balanced with the gas flow rate in order to supply enough BTU's to securely weld the interfaces. If the air is too hot or the gas block too close, non-removable weld wrinkles appear. Under optimum conditions the vertical weld or seam 246 of the tube will initially show wrinkles as depicted in FIG. 16, even after being partially cured by the chiller head. However, when the weld is subjected to the stress of the product load, essentially all wrinkles are removed, and a smooth, virtually invisible weld is achieved, as shown in FIG. 17. If properly formed and chilled, the finished weld line is invisible or near invisible even to close inspection, and shows a virtually complete absence of wrinkling. The chilling head is operated to the benefit of the wrinkling removing effects of the product load stress by not "over-curing" the weld.

The preferred means of temperature control is through a thermocouple in adapter 218 which signals the off-on operation of the calrod heater elements. A vernier rheostat preferably controls the voltage to the calrod heaters. Once the system is in balance, and the rheostat used to adjust the voltage to the calrods, minimum on-off operation is required, and a constant uniform gas temperature is available for welding.

THE BAG SIZING CAGE

The bag sizing cage is illustrated best in FIGS. 18 and 19. The sizing cage comprises vertical side plates 252 and 254 which are mounted by frame attachments (not shown) is opposed fixed relationship. The side plates jointly carry four rotatable, horizontal shafts 256, 258, 260 and 262, which are arranged rectangularly as viewed from the end. Each shaft carries four axially spaced sprockets 264 of identical size. The shafts 256 and 258 cooperate to mount and convey four side-by-side continuous chains 266 to form the vertical conveyor assembly 34. The vertical conveyor assembly 36 is formed by shafts 260 and 262, and four side-by-side continuous chains 268. The conveyors are driven in unison by an enclosed gear train 270 connecting between shafts 256 and 260, and a motor 272 which is coupled to the end of shaft 256, and affixed to vertical side plate 254 through a mounting piece 274. A hydraulic motor is preferably employed of a type having independent torque and speed control. The chains 266 and 268 are preferably double pitch, wing type roller chains to which the slats 40 are affixed through spacer elements 276.

A floating vertical pressure plate 278 backs up the inner run of chains 266, and cooperates in a manner to be described, with a fixed vertical rear support plate 280 which backs up the inner run of chains 268. The floating pressure plate is slidably supported on guide pins 282 that are movable in guide bearings 284. The guide bearings, in turn, are fixedly mounted to a front vertical support plate 286. The latter also mounts a plurality of air cylinders 288 which operate the floating pressure plate on guide pins 282. Both the front and rear vertical support plates extend between and are supported by rigid attachment to vertical side plates 252 and 254.

THE SEALING HEAD ASSEMBLIES

The sealing head assemblies 42 and 44 are illustrated best by FIGS. 20-28.

Referring first to sealing heads 44 (see particularly FIGS. 20-23), the same each comprise an elongated rectangular mold block or holder 294. A plurality of spaced apart arms or trunions 296 are rigidly affixed to the back wall 298 of the mold block. The arms jointly carry a raised mounting shaft 300, which, in turn, is pivotally connected to a back mounting plate 302 through spaced arms or trunions 304 extending normally off the plate. The plate 302 is affixed to roller chains 268 of vertical chain assembly 36 to pivotally mount the molding block thereto with true alignment between the longitudinal axis of the block and the horizontal axis.

Mounted to each end of the mold block is a fixed slideway 310 and 312, respectively. The mold block defines an elongated rectangular cavity 314 which extends between slideways 310 and 312, and is open at the mating face 316 of the mold block. A movable cutter head 318 is contained within cavity 314. The cutter head is attached to slides 320 and 322, operating in slideways 310 and 312, respectively. The slides 320 and 322 each include a roller type cam follower 324 and 326, respectively, which are operated by vertical strip cams 328 and 330 affixed to the rear support plate 280 of the sizing cage. The slide and slideways each include an exhaust port 332 and 334, respectively, which register in the forward cammed position to provide communication between cavity 314 and the atmosphere. A pair of springs 336 connect between each slide and slideway to spring load the cutter head in a retracted rest position.

The cutter head 318 comprises an elongated central knife holding portion 338 defining a narrow slot 340. The slot receives a knife blade or tube parting element or means 342 that is removably secured therein by tightening and loosening set screw assemblies 344. The knife is preferably a scalloped edge, single bevel knife, and is preferably held in the slot at a slight grade over the length thereof, to achieve a scissor-type cutting effect. On each side of the knife holding portion are an aligned series of exhaust ports 346 separated by lands 348. The lands give rigidity to the knife holding portion. The exhaust ports provide communication between the face 350 of the cutter head and the registrable exhaust ports 332 and 334 in the slides and slideways. A raised welding detent 352 is disposed between the terminating longitudinal edges 354 of the cutter head and the exhaust ports 346 on each side of knife blade 342. The face of each detent 352 comprises a backup welding surface, the operative or effective portion of which is spaced from the portions of the tube under clamping pressure, for reasons as will become evident hereinafter.

Referring now particularly to FIGS. 24-26 the sealing heads 42 are in part similar to sealing heads 44. Each include an elongated mold block or holder 360 affixed pivotally to a mounting plate 362 through a shaft 364 and trunions 366 and 368, respectively. The plate, in turn, is affixed in horizontally level fashion to the roller chains of vertical conveyor assembly 34.

A hot gas inlet valve 370 is affixed to one end of mold block 360. The inlet valve includes a raised center post 372 which is elevated above the top wall 374 of the mold block (in reference to the orientation of the mold block as it travels through the sizing cage). At the opposite end of the mold block is a cold gas inlet valve 376 which is identical to valve 370 except that it is reversely oriented so that the center post 378 thereof is offset beyond the bottom wall 380 of the mold block. The center post of each valve is slidably carried in a hollow valve body 382. Each valve is operated by depressing the center post against a spring 384, to unseat a valving heat 386 from an internal valving seat 388. Each valve includes an external valving seat 390 about the center post thereof, for seating the valves against hot and cold gas delivery heads, respectively, as will be described.

The mold block 360 defines an elongated open ended cavity 392. A hollow welding head 394 is inset fixedly in cavity 392 and extends between the hot and cold gas inlet valves 370 and 376. The welding head includes a welding face 396 elevated from the floor of the cavity to define a continuous channel 398. Each valve body 382 communicates with channel 398 through a passageway 400.

The welding face 396 includes an elongated, vertical knife receiving well or slot 402. The knife receiving well is bordered on each side by elongated strips 404 of resilient, high heat withstanding material, which provides a raised back-up surface for cutting.

Extending alongside each strip 404, but spaced therefrom, is a narrow, near continuous slot or stream forming opening or means 406. Narrow lands 408 interrupt and support the slots against possible warpage under high temperature welding conditions. The slots provide communication between channel 398 and welding face 396 for directing the welding and cooling gases as will be explained hereinafter. The floor of the cavity underneath the welding head is lined with a flat heat shield covering 410 such as of Teflon ®. A sealing gasket 412 of relatively high heat withstanding material is peripherally continuous about welding face 396 and is interposed between the sidewalls of the cavity and the welding head. The gasket 412 is raised from the welding face to form a welding space or chamber upon mating of sealing heads 42 and 44 (see FIG. 28), in which the tube is essentially free of mechanical clamping pressures.

THE ENGAGEMENT AND OPERATION OF THE SEALING HEADS

The angle of approach of the sealing heads as they enter the sizing cage is adjustable by set screws 420 attached to each mounting plate 302 and 362. This adjustment is held by springs 422 attached between the mounting plate and the back of mold blocks 294 and 360, respectively. The angle of approach is set so that the sealing heads smoothly roll together and mesh properly (see FIGS. 27 and 28). The sealing heads 44 each mount a set of four over and under guide rollers 424, respectively, through bracket attachments 426. The guide rollers assist to keep register between the sealing heads in the clamped position by engaging fixed locking strips 428 on the bottom wall 380 of the opposite sealing head 42, and fixed break-away brackets 430 on the top wall 374 thereof. The break-away brackets particularly will prevent the sealing head 42 from slipping ahead of the sealing head 44, at the moment the same begin to part or disengage at the bottom of the sizing cage.

The clamping pressure between the sealing heads is controlled by the floating pressure plate 278 with the assistance of rear support plate 280, through regulating the line pressure to air cylinders 288 at the back of the pressure plate. The clamping pressure firmly seats sealing gasket 412 against the mating face of mold block 294, forming an essentially gas tight seal therewith, along opposed clamping zones or areas that extend transversely across the width of the tube, and which are separated in the longitudinal direction, to define the upper and lower limits of the welding chamber.

Almost simultaneously with the clamping of the film between the sealing heads, the cam rollers on slides 320 and 322 engage strip cams 328 and 330, respectively. The slides force the cutter head forward on slideways 310 and 312, causing knife 342 to cut or part the tubing at welding face 396. The detents on the cutter head draw the parted edges or cut ends 432 and 434 of the tube away from the knife well as the knife moves to the extreme forward position, thereby separating and defining a space between the cut ends which communicates with exhaust ports 346.

At this moment, a moving hot gas supply head 436 moves vertically down upon the hot gas inlet valve 370, seating with the valve and depressing the center post to force a heated welding gas, such as air into channel 398. The operation and structure of the assembly supplying heated gas (and also the assembly supplying cooling gas in the latter part of the weld forming cycle) is described in some detail hereinafter.

The hot gas introduced into channel 398 escapes at high velocity through the directional slots 406, preferentially striking an extreme portion of the cut ends, remote from the clamped areas or zones, and then venting from the welding chamber through the exhaust ports 346 on each side of the knife, and eventually to the atmosphere through the ports 332 and 334 which register in the forward cammed position. The high velocity directional flow of the hot gas causes the cut plastic ends to lay down smoothly against detents 352 by fluid or velocity pressure to intimately contact all interfaces of the cut ends. Outwardly of the detents, dead spaces or buffer areas 438 are defined in the welding chamber that are removed from the primary flow of the heated gas streams. Retarded heat transfer and flow conditions exist in dead spaces to selectively prevent heat deformation temperatures to extend to areas of the tube under clamping pressure.

The cut ends, due to the directionality and flow of the hot gas streams are bathed in hot gas to a molten or near molten condition. The thinning of the cut ends is only a function of velocity pressure since the cut ends are not mechanically restrained. The velocity pressure of the welding stream is sufficient to intimately hold the layers of the cut ends together to form a strong bond between all interfaces as sealing or welding temperatures are reached. Too much velocity pressure can "wash out" the cut ends, causing undesirable thinning. Most optimally, therefore, the velocity pressure is sufficient to hold the intimate contact between the welding faces, but not so high as to thin and wash out the cut ends, and the temperature of the hot gas stream is controlled to provide sufficient BTU's of heat to form a strong weld at all interfaces. If velocity pressure is correct, the welds can be formed showing virtually no thinning throughout the entire extent thereof. Under proper welding conditions the unrestrained cut edges tend to shrink back to form a thickened or swollen weld of remarkably tough quality.

In order to provide a uniformly strong weld across the tube, the hot gas welding stream must flow at essentially uniform velocity over the length of the directional slots. This is achieved by designing the cross-sectional area of channel 398 to be greater by a certain factor than the combined cross-sectional area of the directional slots. In an experimental shop apparatus, using a welding head 394 as illustrated herein, the most restricted cross-sectional area of this chamber was designed to be approximately four times the area of the combined cross-section of the directional slots. This factor of four was adequate in this particular design to achieve essentially uniform flow conditions provided a minimum threshold pressure was maintained in the channel. The threshold pressure is that at which the channel is able to readily feed the directional slots without suffering a pressure drop from the infeed end thereof to the opposite end of the chamber.

At the end of the welding cycle, the moving hot gas supply head disengages, releasing the center post, thereby closing the hot gas inlet valve.

Near simultaneously, a movable cold gas supply head engages the underside of sealing head 42, to open cold gas inlet valve, and introduce a cooling gas into channel 398. The cooling gas stream is directionally applied to the welds to cure the welds sufficiently to accept the product load without damage to the weld. Refrigerated gas can be used to achieve high speed cooling cycles.

The cold gas supply head then automatically disengages, closing the cold gas inlet valve. The cammed knife holder reaches the end of the strip cams, causing the cutter head to retract, and withdrawing knife 342 from knife well 402. The sealing heads then release, depositing the finished bag on the outfeed conveyor 56.

HOT AND COOL GAS SUPPLY TO SEALING HEADS

The hot gas supply assembly is shown as reviewed from the top in FIG. 18, as denoted generally by reference numeral 446, and front and side elevational views thereof are presented in FIGS. 29 and 30.

The hot gas supply assembly comprises the hot gas supply head 436 which is mounted for reverse movement in the vertical direction by fixed attachment to a slide 448 which moves on a fixed slideway 450 mounted directly to vertical side plate 254.

The slide is operated by a vertical air cylinder 470 which is rigidly affixed to vertical side plate 254 through a reinforced mounting 472. The arm 474 of the air cylinder moves the slide through periodic contact with a shock absorber 476 which is mounted to the middle part of slide 448 through a right angle bracket 478.

A vertical telescoping tube 444 is connected to the underside of the supply head and receives compressed gas from a pressure regulated line 452. The stationary part 454 of tube 444 is supported by attachment to vertical side plate 254 through a holder element 456, and a bracket plate 458. The telescoping tube communicates through a passage 460 in the supply head, with a pair of side-by-side calrod heating units 462 and 464 affixed to the top of the supply head. The compressed gas is delivered up the telescoping tube, through passage 460, up the calrod heater element 462, then across to the opposite calrod element 464, through a connector 466, from whence it moves back downwardly to the supply head, and eventually out an outfeed port 486. The outfeed port is aligned vertically with the hot gas inlet valve, and centrally mounts an internal actuating post (not shown).

The cycle begins with the air cylinder arm extended, which supports the supply head above sealing head 42. At the proper moment, the air cylinder shaft is retracted, causing the head to slide downwardly and engage the hot gas valve, automatically opening the valve through contact between the actuating post, and the center post of the valve. The supply head will continue to ride the sealing head downwardly until the shock absorber impacts the reacted shaft of the air cylinder, automatically disengaging the supply head from the sealing head at the proper moment. The air cylinder then returns the supply head to the starting position in time for the next cycle.

Preferably a solenoid valve (not shown) is employed to operate the compressed gas line 452 for the duration of the welding process, and then to automatically valve the line closed. The temperature of the hot welding gas is preferably monitored and regulated through a thermocoupling and a temperature controller (not shown).

The cold gas supplying unit which is denoted generally by Reference Numeral 480 in FIGS. 18, 31 and 32, is much like the hot gas unit described above, except it doesn't include heating elements or a shock absorber to protect the heating elements from jarring. It includes a cool gas supply head 482 affixed to a slide 484 that moves vertically on a fixed slideway 486. The fixed slideway is mounted directly to the vertical side plate 252.

A second vertical air cylinder 488 is affixed to the vertical side plate 252, near the top edge of the side plate, by a yoke and rigid arm connection 490 therewith. The arm 492 of the air cylinder extends downwardly to connect with and operate the supply head 482 on slide 484. A second vertical telescoping tube 494 includes an upper stationary part 496 that is affixed to the vertical side plate 252 through a holder element 498; and a movable part 500 that connects into supply head 482. A regulated compressed gas line 502, controlled preferably by an off-on solenoid valve (not shown), supplies compressed gas through the telescoping tube to the supply head. The gas eventually emerges out an outlet port 504 on the top surface of the supply head. An actuating post (not shown) is centered in the outlet port.

To begin the cooling cycle, the air cylinder arm 492 is in the retracted position, lifting the supply head 482 to an elevated starting position. As each sealing head 42 periodically descends in the sizing cage, it eventually engages the elevated supply head 482, and will ride the same downwardly in aligned relationship so that the actuating post depresses the cool gas inlet valve. Simultaneously the gas line 502 is operated to introduce pressurized cooling gas to channel 398 to feed slots 406. At the termination of the downward run, and after a moments pause to allow the sealing head 42 to clear, air cylinder 488 is operated to return the supply head to the starting position to repeat the cycle.

PROGRAMMER AND MECHANICAL GUSSETING ARMS

A horizontal timing shaft 510 shown near the top of FIG. 18, and in cross-section in FIG. 31, is jointly carried by vertical side plates 252 and 254. The timing shaft is rotatably driven off shaft 260 by a timing belt 512, and pulleys 514 and 516. The pulleys are of a ratio so that the timing shaft turns one revolution per linear movement by the vertical conveyors equal to one bag length.

A programmer 518 is mounted to the exterior side of vertical side plate 254, and is encased in a cover member 520. The programmer is illustrated somewhat schematically, and includes a series of aligned programming cams 522 (only one shown) which are rotatably driven by the timing shaft through a right angle drive 524. The cams operate a series or panel of limit switches 526 mounted on a switch plate 528, to thereby control all the decision making functions and programming of apparatus 10.

A pair of gusseting arms 530 and 532 are affixed to the rear support plate 280 through bearing housings 534 and 536, respectively. The gusseting arms are revolvably supported in the bearing housings, and are driven off the timing shaft by means of second and third right angle drives 538 and 540, respectively, also affixed to the rear support plate, and associated gear connections 542 and 544, respectively. A one-to-one gear ratio is employed, whereby the gusseting arms turn one revolution for each revolution of the timing shaft.

The gusseting arms are optionally provided, since the same are unnecessary where the operation permits the afore-described gusseting procedure to be completed by unassisted vacuum force. However, for certain fine grained and/or dusty products, a limiting condition on the use of vacuum force will be reached if objectionable amounts of the product are drawn off through evacuation fan 94. Where the threshold of this condition is reached at a vacuum force less than that necessary to form neat gussets, mechanical assistance in forming the gussets can be employed, together with that degree of vacuum draw available under the limited conditions.

The gusseting arms are operated to revolve continuously clockwise and counterclockwise, respectively, and are timed to simultaneously engage the opposite sides of the bag and be generally at the horizontal or most inward position at the moment the sealing heads mate, preferably at a spacing of about ½ inch (1.27 cm) below the sealing heads. These arms serve to assist in quickly setting the depth of the gussets, and to clear wrinkles from the area of the gussets just prior to the mating of the sealing heads.

MODIFIED FILLING MANDREL

A modified filling mandrel 26a which is shown in FIGS. 33 and 34, includes a slide strip or bar 546 disposed in spaced, peripherally continuous relationship about the lower terminating end portion 46a of the filling mandrel. The strip is rigidly connected to end portion 46a by spacer elements 548. The clearance is preferably about 1/16 to about ⅛ of an inch, (1.6 to 3.2 mm) and is designed to leave an open route or passage for a high velocity stream of air to be sucked downwardly between the filling mandrel and the tube, under the condition of internal evacuation of the filling mandrel. The high velocity stream continuously washes the inside surfaces of the tube to prevent settling of the product dust and debris thereon, thus retaining the surface in a more virgin or non-contaminated state for sealing or welding.

EXAMPLE I

The apparatus and the process hereof is practiced to make industrial bags from various single and double ply webs of 40¼ inches (102.24 cms) in width. The webs in all instances comprise a modified polyethylene thermoplastic material, and range in thickness from about 4 to 8 mils (0.1 to 0.2 mm). The bags have a length of about 27 inches (68.6 cms), an internal volume of approximately 1 cubic foot (28 liters), and are each filled with a product load of polyethylene beads weighing approximately 50 pounds (22.65 kgs). The production rate is six bags per minute. A vacuum of 3½ inches (8.9 cms) $H_2O$ is drawn on the filling mandrel to gusset the bags without mechanical assistance. The vertical seam welder supplies heated air to a one inch overlap on the tube at approximately 320° F. (160° C.) using a ¼ inch (0.64 cm) I.D. supply hose operated at a line pressure of about 20 to 22 psig (2.4–2.54 kg/sg cm). The sealing heads weld at a temperature of between about 425° to about 475° F. (218° to 246° C.), and are supplied from a 1¼ inch (3.2 cms) I.D. hose, operated at approximately 25 pounds psig (2.75 kg/sg cm) line pressure. The initial blast of heated welding gas is presumed to be at a higher temperature than the control instrument reads. The thermocouple does not accurately monitor instantaneous changes in temperature, and the initial blast comprises residual air that has dwelled in the calrod heating elements. The duration of the welding and cooling cycles are approximately 1½ to 2 seconds each. The cooling gas is non-refrigerated or ambient air supplied from a 40 pound psig (3.8 kg/sg cm), compressed air line. The air bearing is operated at 60 psig (5.2 kg/sg cm) and comprises tubing of 5/16 inch (0.8 cm) O.D., and ¼ inch (0.64 cm) I.D.

Satisfactory industrial bags are produced with a high degree of repeatability. The end seals or welds are characteristically curled and thickened, and show virtually no delineated or pronounced lines of weakness. The end welds are approximately ¼ inch (0.64 cm) in width and strong across the entire extent of the bags even at the points of abrupt thickness change. The vertical seam or weld is varied from about ½ to ¾ inch (1.27 to 1.9 cm) in width. This weld can also be made with a high factor repeatability from bag to bag, and characteristically shows no wrinkling and is invisible or near invisible to close visual inspection.

EXAMPLE II

The general operating conditions of Example I are observed in this Example II with the exceptions that the product load comprises Kedlor ® high protein stock feed, and secondly, the filling mandrel is modified generally according to FIGS. 33 and 34 to incorporate a strip 546. By means if this modification, a high velocity stream is made available that continuously washes the inside surface of the tube. The stream is adequate to provide a sufficiently clean surface to achieve good welding results, even though the described product includes excessive dust. Without the modification dust contamination produces nonhomogeneous welds.

EXAMPLE III

Various web materials of both single and multiple plies are formed into a tube using an overlapped longitudinal seal, and the tube is gusseted on opposite sides. The various tubes (in an unfilled state) are then clamped between co-acting sealing heads operating under the general principles of this invention, to form a transverse weld to secure the end of the tube. Successful welding results are achieved over a wide range of web thicknesses and materials as tabulated below.

| Web Materials* | Thickness Variation Along Length of Weld Line | |
| --- | --- | --- |
| | Minimum Thickness | Maximum Thickness |
| 3 Mil (.08) LDPE (single ply) | 6 Mil (.15) | 12 Mil (.3) |
| 3 Mil (.08) EVA/3 Mil (.08) EVA (two ply) | 12 Mil (.3) | 24 Mil (.6) |
| 4 Mil (.1) EVA/4 Mil (.1) EVA (two ply) | 26 Mil (.4) | 32 Mil (.8) |
| 4 Mil (.1) LAM/8 Mil (.2) LDPE (two ply) | 24 Mil (.6) | 48 Mil (1.2) |
| 8 Mil (.2) LDPE/4 Mil (.1) LAM/8 Mil (.2) LDPE (three ply) | 40 Mil (1.0) | 80 Mil (2.0) |
| 3 Mil (.08) LDPE/4 Mil (.1) Vinyl/2 Mil (.05) LDPE (three ply) | 26 Mil (.66) | 52 Mil (1.32) |
| 3 Mil (.08) DCPP/3 Mil (.08) LDPE/3 Mil (.08) MDPP (three ply) | 18 Mil (.46) | 36 Mil (.9) |
| 4 Mil (.1) EVA/LDPE Impregnated Nylon Scrim/4 Mil (.1) EVA (three ply) | 36 Mil (.9) | 72 Mil (1.8) |
| 6 Mil (.15) LDPE/LDPE Impregnated Cotton Cheesecloth Scrim/6 Mil (.15) LDPE (three ply) | 34 Mil (.86) | 68 Mil (1.73) |
| 4 Mil (.1) LDPE/4 Mil (.1) LDPE/5 Mil (.13) LDPE (three ply) | 26 Mil (.66) | 52 Mil (1.32) |

*LDPE - Low density polyethylene
EVA - Ethylene vinyl acetate
MDPP - Medium density polypropylene
LAM - A co-extruded film of LDPE/EVA/Saran/EVA/LDPE
Figures in parentheses are millimeters

What is claimed is:

1. Apparatus for preparing filled side gusseted industrial size bags, the apparatus comprising a tube former for converting a flexible, heat sealable web into a generally vertical, upwardly open tube, a hollow mandrel about which the tube is formed and which extends downwardly into the tube through the open end thereof, the mandrel having an integral lower end portion of a shape adapted to impart opposed inward tucks to the tube by intimate conforming contact therewith, means to periodically clamp the tube in a transverse zone positioned generally near to and underneath the mandrel and which zone extends across the width of the tube to define a temporary bottom, said clamping means being movable to draw the tube downwardly to prepare successive product receiving spaces, means to fill the successive product receiving spaces with product, evacuation means to conform the tube intimately against said lower end portion of the mandrel by vacuum suction and to impart said inward tucks to the tube in a region generally adjacent the top of the filled product load of the successive product receiving spaces, and whereby repetition of the clamping of the tube temporarily retains the inward tucks in the tube, means to part the tube transversely in the clamped zone and means to seal the plies of the tube together along each side of the part line, thereby permanently fastening the inward tucks in the seal closing the top of the last filled product receiving space, and simultaneously into the seal closing the bottom of the next succeeding product receiving space.

2. The apparatus as recited in claim 1 wherein said clamping, parting, and sealing means comprise: means in the clamping means to define a welding space in which the tube is free of mechanical clamping pressures, means to transversely part the tube in the welding space along a line remote from the clamped portions to urge the plies of the parted edges into generally intimate contact across the transverse extent thereof by velocity pressure, through applying high velocity gas streams to the parted edges, means to heat the gas streams to seal the parted edges at least partially by the heat contained in said streams, said urging means being adapted to direct the heated gas streams preferentially upon a portion of the parted edges, respectively, located remote from the areas of the tube under clamping pressures, passage means in communication with the space between the parted edges, for generally immediately venting the heated gas streams from the welding space after impingement thereof against said parted edges.

3. The apparatus as recited in claim 2, including means sequentially operational after the application of the heated gas streams, to form and apply high velocity streams of cooling gas to the parted edges prior to releasing the clamping pressure.

4. The apparatus as recited in claim 3, wherein said urging means is adapted to impart a generally uniform velocity pressure to said parted edges across the transverse extent thereof.

5. The apparatus as recited in claim 1, including means externally of the tube, to mechanically restrain the outward movement of the tube away from the extreme lower end of the mandrel accompanying the dump of the product load, to assist reforming the inward tucks in the tube after each dump.

6. The apparatus as recited in claim 5, wherein the restraining means is closely spaced about the periphery of the mandrel, and is generally peripherally continuous about the tube.

7. The apparatus as recited in claim 1 wherein said lower end portion of the mandrel defines a circumferentially continuous sidewall, and wherein said sidewall defines opposed generally flat sides, and opposed inwardly formed generally V-shaped sections.

8. The apparatus as recited in claim 1 including opposed mechanical gusseting members disposed on opposite sides of the tube, and adapted to periodically and simultaneously engage the tube beneath the mandrel in the interval prior to closing of the clamping means, to assist forming the inward tucks.

9. The apparatus as recited in claim 1, including means forming a narrow channel between the periphery of the mandrel and the interior surface of the tube, and which communicates between the product receiving space and the atmosphere, to make available with the evacuation of the mandrel, a stream of air that is sucked down through said channel to aspirate the inside surface of the tube, and thereby prepare a less contaminated surface for sealing.

10. In apparatus for providing a flexible, generally vertical tube, simultaneously with the periodic dumping of pre-measured product loads into the tube, and the collapsing and transverse sealing of the tube at spaced intervals to form therefrom filled bags, the combination which includes: a hollow mandrel about which the tube is formed, means to periodically clamp the tube underneath the filling mandrel, and means to draw the tube downwardly to provide a product receiving space for the product load, means in proximate positioning to the clamping means to transversely seal the tube, the improvement which comprises, evacuation means to partially evacuate the product receiving space, means to form a narrow channel between the inside surface of the tube and the mandrel, said channel forming means being adapted to provide communication between the product receiving space and the atmosphere to make available, cooperatively with the evacuation of the product receiving space, a stream of air that is sucked downwardly between the tube and the mandrel, to aspirate the inside surface of the tube to prepare a less contaminated sealing surface.

11. The apparatus as recited in claim 10, wherein the drawing means is programmed to vertically enlarge the product receiving space after the completion of each dump, whereby a fresh section of the tube is exposed beyond the lower terminating end of the mandrel in the area to be subsequently clamped and sealed.

12. The apparatus as recited in claim 10, including shaping means internally of the tube and positioned in a region adjacent to the upper clamping position, and being adapted to impart by contact a gusseted configuration to the tube with the assistance of said evacuation means, to thereby prepare the tube for the permanent formation of a gusseted structure therein by the subsequent operation of the clamping and sealing means.

13. The apparatus as recited in claim 10, wherein said clamping and sealing means comprise: means in the clamping means to define a welding space in which the tube is free of mechanical clamping pressures, means to transversely part the tube in the welding space along a line between and remote from the clamped portions of the tube, means operative in the clamped position to urge the plies of the parted edges into generally intimate contact across the transverse extent thereof by velocity pressure, through applying high velocity gas streams to the parted edges, means to heat the gas streams to seal the parted edges by the heat contained in said streams, said urging means being adapted to direct the heated gas streams preferentially upon a transverse portion of the parted edges, respectively, located remote from the areas of the tube under clamping pressures, passage means in communication with the space between the parted edges, for generally immediately venting the heated gas streams from the welding space after impingement thereof upon the parted edges.

14. The apparatus as recited in claim 10, including means to continuously evacuate the product receiving space and means to at least partially and momentarily relieve the vacuum in the product receiving space accompanying the initiation of each dump of the product load.

15. In apparatus for providing a flexible, generally vertical tube, simultaneously with the periodic dumping of pre-measured product loads into the tube, and collapsing the transverse sealing of the tube at spaced intervals to form therefrom filled bags, the combination which generally includes: a hollow mandrel about which the tube is formed, filling means to periodically dump a product load through the mandrel into the tube, means to periodically clamp the tube underneath the mandrel to draw the tube downwardly to provide a product receiving space for the product load, means in proximate positioning to the clamping means to transversely seal the tube, the improvement which comprises, means to partially evacuate the product receiving space, the filling means including a chamber periodically in communication with the mandrel, and adapted to hold the product load for a short interval prior to the dumping of the same into the tube, and means to partially evacuate said chamber.

16. The apparatus as recited in claim 15, wherein the evacuation means of the chamber is of generally high capacity, low vacuum rating relative to a low capacity, high vacuum rating of the evacuation means of the product receiving space.

* * * * *

UNITED STATES PATENT AND TRADEMARK OFFICE
CERTIFICATE OF CORRECTION

PATENT NO. :  4,073,121

DATED :  February 14, 1978

INVENTOR(S) :  E. L. Greenawalt et al.

It is certified that error appears in the above-identified patent and that said Letters Patent are hereby corrected as shown below:

On cover page, under "Related U. S. Application Data" line 1, insert the word --abandoned-- after "1975".

Col. 1, line 8, add --now abandoned-- after "1975".

Col. 2, line 18, delete the word "can".

Col. 3, line 1, delete "commerically" and insert --commercially--.

Col. 3, line 48, delete "is" and insert --it--.

Col. 6, line 15, delete "extend" and insert --extent--.

Col. 6, line 39, delete "if" and insert --is--.

Col. 10, line 36, delete "tranversely" and insert --transversely--.

Col. 11, line 38, delete the word "is" and insert --in--.

UNITED STATES PATENT AND TRADEMARK OFFICE
CERTIFICATE OF CORRECTION

PATENT NO. : 4,073,121

DATED : February 14, 1978

INVENTOR(S) : E. L. Greenawalt et al.

It is certified that error appears in the above-identified patent and that said Letters Patent are hereby corrected as shown below:

Col. 13, line 7, delete "heat" and insert --head--.

Col. 18, line 50, delete the word "if" and insert --of--.

Signed and Sealed this

Twentieth Day of June 1978

[SEAL]

Attest:

RUTH C. MASON
Attesting Officer

DONALD W. BANNER
Commissioner of Patents and Trademarks